United States Patent [19]

Higashihara et al.

[11] Patent Number: 5,061,951
[45] Date of Patent: Oct. 29, 1991

[54] AUTO FOCUS DEVICE

[75] Inventors: Masaki Higashihara, Yokohama; Ichiro Ohnuki, Kawasaki; Akira Akashi; Terutake Kadohara, both of Yokohama, all of Japan

[73] Assignee: Canon Kabushiki Kaisha, Tokyo, Japan

[21] Appl. No.: 582,118

[22] Filed: Sep. 14, 1990

Related U.S. Application Data

[63] Continuation of Ser. No. 350,855, May 12, 1989, abandoned.

[30] Foreign Application Priority Data

May 13, 1988 [JP] Japan .................................. 63-116452

[51] Int. Cl.$^5$ .............................................. G03B 13/36
[52] U.S. Cl. ...................................... 354/400; 354/402
[58] Field of Search ................................ 354/400, 402

[56] References Cited

U.S. PATENT DOCUMENTS

| 4,600,832 | 7/1986 | Grund | 354/402 |
| 4,681,419 | 7/1986 | Sakai et al. | 354/402 |
| 4,762,986 | 8/1988 | Suda et al. | 354/402 |
| 4,783,677 | 11/1988 | Hamada et al. | 354/402 |
| 4,816,856 | 3/1989 | Hamada et al. | 354/402 |
| 4,841,325 | 6/1989 | Hoshino et al. | 354/402 |
| 4,908,645 | 3/1990 | Higashihara et al. | 354/402 |

Primary Examiner—Russell E. Adams, Jr.
Attorney, Agent, or Firm—Fitzpatrick, Cella, Harper & Scinto

[57] ABSTRACT

An auto focus device which foreseeing-calculates a change in the focal plane based on the movement of an object after a predetermined time on the basis of focus detection result in the past and a latest focus detection result, and moves a lens to the foreseeing-calculated position. Whether the data used for the foreseeing calculation are data suitable for the foreseeing calculation is judged each time focus detection is effected, and when it is continuously judged that the data are data unsuitable for the foreseeing calculation, lens driving based on the foreseeing calculation is inhibited.

19 Claims, 14 Drawing Sheets

AUTO FOCUS DEVICE

This application is a continuation of application Ser. No. 07/350,855 filed on May 12, 1989, now abandoned.

BACKGROUND OF THE INVENTION

1. Field of the Invention

This invention relates to an automatic focus adjusting device for use in a camera or the like.

2. Related Background Art

Many of the automatic focus adjusting systems of single-lens reflex cameras have been designed to focus to an object by repetitively effecting the cycles of "focus detection (sensor signal inputting and focus detection calculation) and lens driving". The amount of lens driving in each cycle is based on the defocus amount at a point of time whereat focus detection has been effected in that cycle, and this presumes that the defocus amount during focus detection is eliminated at the end of lens driving.

As a matter of course, focus detection and lens driving require their respective times, and in the case of a stationary object, the defocus amount does not vary as long as the lens is not driven and therefore, the defocus amount to be eliminated at a point of time whereat lens driving has been completed is equal to the defocus amount at a point of time whereat focus detection has been effected, and correct focus adjustment is accomplished.

However, in the case of an object in great motion, the defocus amount varies during focus detection and lens driving, and sometimes, said defocus amount to be eliminated and the detected defocus amount differ remarkably from each other and this results in the problem that the lens is not in focus to the object at the end of lens driving.

The same assignee of the present application has previously filed Japanese Patent Application No. 62—263728 as an automatic focus adjusting system directed to the solution of the above-noted problem.

The gist of the method disclosed in the above-noted patent application is to foresee the variation in the defocus attributable to the movement of an object, and to apply correction to the amount of lens driving (hereinafter referred to as the pursuit correction) in view of the detected variation in the defocus in each said cycle and the time interval between said cycles, and the solution of the above-noted problem by this method is expected from the viewpoint of the focusing accuracy at the end of lens driving.

However, when the pursuit correction is actually done, the following problem arises.

If the object in the distance measuring field shifts to another object when the object is being pursued in the pursuit correction mode, the continuity of the change in the imaging plane position will be lost and therefore, if foreseeing is done on the basis of the data of the past object and the data of the new object, the foreseeing will become wrong and as a result, the lens will be driven to an entirely different position.

If the object in the distance measuring field thus shifts to another object, wrong foreseeing will be done, and there exists the problem that this is not eliminated as long as foreseeing control is effected by the use of the data of the old object.

The operation of the device of the above-mentioned Japanese patent application will hereinafter be described with reference to the accompanying drawings.

FIG. 2 is a graph for illustrating the lens driving correction method proposed by the above-mentioned Japanese patent application. In FIG. 2, the horizontal axis represents time t and the vertical axis represents the imaging plane position x of the object.

The curve x(t) indicated by the solid line represents the imaging plane position at time t of an object which comes near the camera in the direction of the optic axis when the photo-taking lens is at infinity. The curve l(t) indicated by broken line represents the position of the photo-taking lens at the time t, and the lens is in focus when x(t) and l(t) coincide with each other. [ti, ti'] represents the focus detecting operation, and [ti, ti+1] represents the lens driving operation. In the example shown in FIG. 2, it is assumed that the imaging plane position changes in accordance with a quadratic function. That is, if the current and past two imaging plane positions $(t_1, x_1)$, $(t_2, x_2)$ and $(t_3, x_3)$ are known at time $t_3$, the imaging plane position $x_4$ at time $t_4$ after TL (AF time lag + release time lag) from the time $t_3$ can be foreseen on the basis of the equation $x(t) = at^2 + bt + c$.

However, what can actually be detected by the camera are not the imaging plane positions $x_1$, $x_2$ and $x_3$, but the defocus amounts $DF_1$, $DF_2$, $DF_3$ and the amounts of lens driving $DL_1$, $DL_2$ as converted into the amounts of movement of the imaging plane. Time $t_4$ is a value in the future to the last, and is a value which varies as the accumulation time of an accumulation type sensor is varied by the luminance of the object, and here, for simplicity, it is assumed as follows:

$$t_4 - t_3 = TL = TM_2 + \text{(release time lag)} \tag{1}$$

Under the above assumption, the amount of lens driving $DL_3$ calculated from the result of the focus detection at time $t_3$ can be found as follows:

$$x(t) = at^2 + bt + c \tag{2}$$

When $(t_1, l_1)$ in FIG. 2 is considered to be the origin, $$t_1 = 0 \qquad x_1 = DF_1 \tag{3}$$
$$t_2 = TM_1 \qquad x_2 = DF_2 + DL_1 \tag{4}$$
$$t_3 = TM_1 + TM_2 \quad x_3 = DF_3 + DL_1 + DL_2 \tag{5}$$

If the equations (3), (4) and (5) are substituted into the equation (2), a, b and c are found as follows:

$$a = \frac{DF_3 + DL_2 - DF_2}{(TM_1 + TM_2) \cdot TM_2} + \frac{DF_1 - DL_1 - DF_2}{(TM_1 + TM_2) \cdot TM_1} \tag{6}$$

$$b = \frac{DF_2 + DL_1 - DF_1 - a \cdot TM_1^2}{TM_1} \tag{7}$$

$$c = DF_1 \tag{8}$$

Consequently, the amount of lens driving $DL_3$ as converted into the amount of movement of the imaging plane at time $t_4$ is found as follows:

$$DL_3 = x_4 - l_3 \quad (9)$$
$$= x_4 - x_3 + DF_3$$
$$= a\{(TM_1 + TM_2 + TL)^2 - (TM_1 + TM_2)^2\} + b \cdot TL + DF_3$$

A problem arising when the object in the distance measuring field shifts to another object will now be described with reference to FIG. 3.

FIG. 3 shows the relation between time and the imaging plane position, and the solid line indicates the imaging plane position of a first object, and the dot-and-dash line indicates the imaging plane position of a second object.

Here, let it be assumed that at times $t_1$ and $t_2$, focus detection is effected for the first object and the lens is driven, and at time $t_3$, focus detection is effected for the second object.

Thereupon, on the camera side, the imaging plane positions $x_1$, $x_2$ and $x_3'$ at times $t_1$, $t_2$ and $t_3$, respectively, are calculated from the defocus amount and the amount of lens driving obtained by focus detection, and a quadratic function f(t) passing through $(t_1, x_1)$, $(t_2, x_2)$ and $(t_3, x_3')$ is calculated, and from this f(t), the imaging plane position $x_4''$ at time $t_4$ is foreseen.

However, the imaging plane position of the first object at the time $t_4$ is $x_4$ and the imaging plane position of the second object at the time $t_4$ is $x_4'$, and $x_4''$ obtained by foreseeing is a position differing from the imaging plane position of either object.

Thus, to foresee the imaging plane position $x_4$ of the first object, it is necessary to find a function passing through $(t_1, x_1)$, $(t_2, x_2)$ and $(t_3, x_3)$, and to foresee the imaging plane position $x_4'$ of the second object, it is necessary to find a function passing through $(t_1, x_1')$, $(t_2, x_2')$ and $(t_3, x_3')$.

However, the distinction between the first object and the second object is not made in the camera and therefore, foreseeing calculation is effected by the use of the defocus amount obtained at the time $t_3$ by focus detection. As a result, the foreseeing function is neither the approximate function of the imaging plane position of the first object, nor the approximate function of the imaging plane position of the second object, and thus, the foreseen lens driving position also becomes wrong. This is a problem which arises whenever the photographer changes over the main object to the second object while pursuing the first object because the wrong foreseeing as described above will result if the data of the focus detection effected for any other object than the main object exists in the data used for foreseeing.

The assignee of the present invention has previously filed Japanese Patent Application No. 62—328233 as a countermeasure for such a problem. The gist of this patent application is to immediately discontinue the pursuit mode by said foreseeing process when there is brought about a condition unsuitable for foreseeing, such as the loss of the continuity of the change in the imaging plane position or the low luminance of the object, thereby preventing said inconvenience, and according to the technique shown in this patent application, the above-described inconvenience can be prevented.

As described above, according to the technique shown in the aforementioned patent application, when an object differing from the original object is distance-measured, foreseeing driving can be inhibited and the out-of-focus problem as noted above can be solved, but even when there is camera shake or another object temporarily crosses the front of the camera, said foreseeing driving is inhibited and much time is taken until another foreseeing driving is started, and this leads to the undesirable possibility of missing the shutter opportunity.

SUMMARY OF THE INVENTION

One aspect of the application is to provide an auto focus device which does not immediately inhibit the foreseeing lens driving when there has been brought about said condition unsuitable for foreseeing, but inhibits the foreseeing lens driving when said condition unsuitable for foreseeing is continuing.

One aspect of the application is to provide, under the above object, an auto focus device designed such that when a condition unsuitable for foreseeing is discriminated by repetitive focus detecting operations, the data obtained by the then focus detection is not used for the foreseeing calculation, and the data obtained by the next focus detecting operation is used for the foreseeing calculation.

One aspect of the application is to effect focus detection again when the continuity of the change in the imaging plane position is once lost during foreseeing driving and the foreseeing driving is discriminated as being unsuitable, to discriminate again on the basis of the data of the second focus detection and the data in the past whether the foreseeing driving is unsuitable, to continue said foreseeing driving when it is discriminated as being not unsuitable by this discrimination, and to inhibit said foreseeing driving when it is discriminated as being unsuitable, that is, when the foreseeing driving is discriminated as being unsuitable a plurality of times (twice) in succession.

Other objects of the present invention will become apparent from the following detailed description of an embodiment thereof taken in conjunction with the accompanying drawings.

DESCRIPTION OF THE PREFERRED EMBODIMENT

Figure 4:
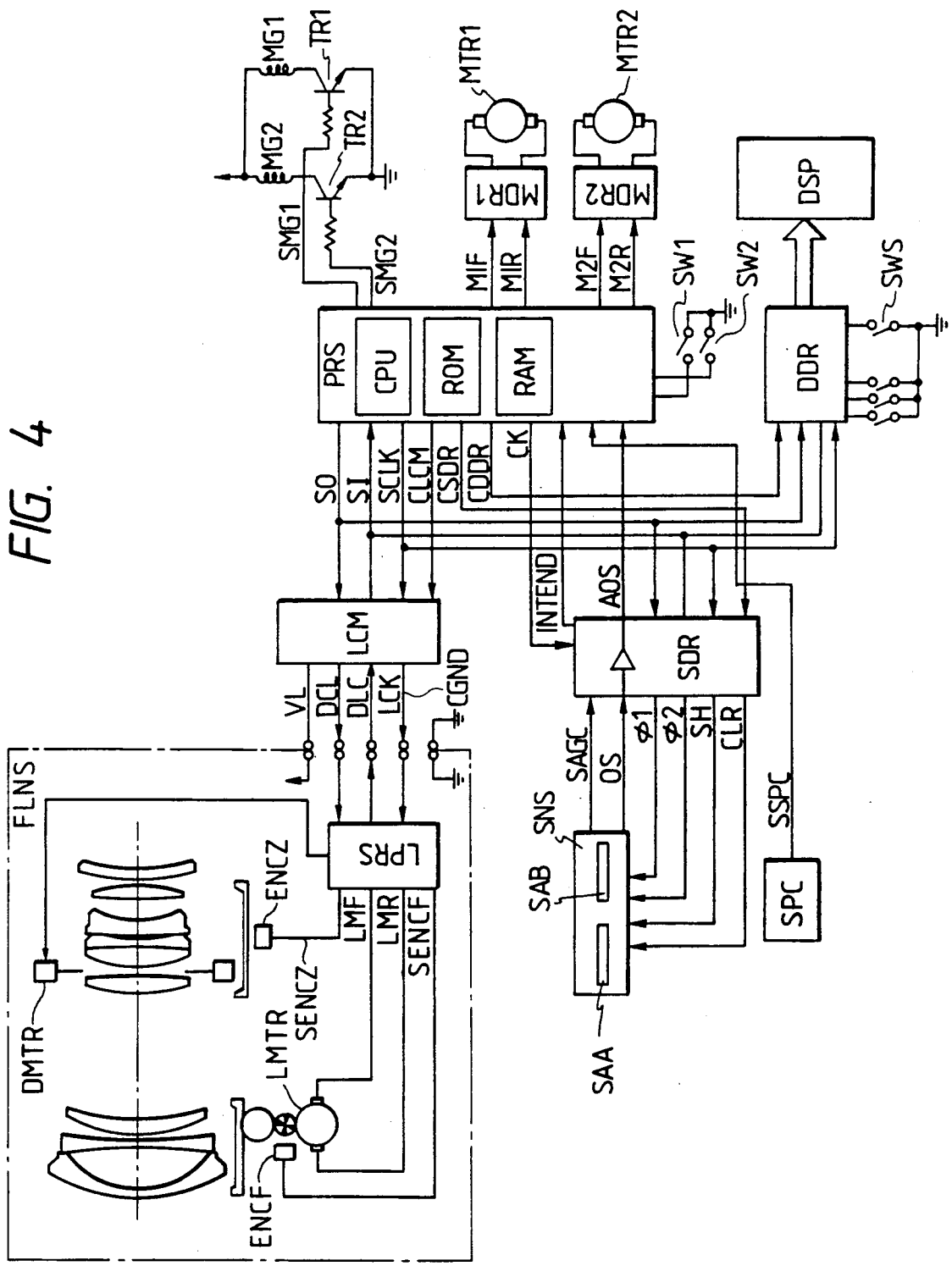
FIG. 4 is a circuit diagram showing an embodiment of the focus adjusting device of the present invention.

FIG. 4 is a circuit diagram showing an embodiment of a camera provided with an auto focus device according to the present invention.

In FIG. 4, PRS designates the control device of the camera which is, for example, a one-chip microcomputer having therein a CPU (central processing unit), a ROM, a RAM and an A/D converting function. The computer PRS performs a series of operations of the camera such as the automatic exposure control function, the automatic focus detecting function and winding-up of film in accordance with the sequence program of the camera stored in the ROM. For that purpose, the computer PRS communicates with the surrounding circuits in the camera body and the lens by the use of synchronizing type communication signals SO, SI, SCLK and communication selection signals CLCM, CSDR, CDDR, and controls the operations of each circuit and the lens.

SO is a data signal output from the computer PRS, SI is a data signal input to the computer PRS, and SCLK is a synchronizing clock for the signals SO and SI.

LCM denotes a lens communication buffer circuit which supplies electric power to a power source terminal for the lens when the camera is in operation, and provides a communication buffer between the camera and the lens when the selection signal CLCM from the computer PRS is at a high potential level (hereinafter referred to as 'H').

That is, when the computer PRS renders the signal CLCM into 'H' and delivers predetermined data from SO in synchronism with SCLK, the lens communication buffer circuit LCM outputs buffer signals LCK and DCL for SCLK and SO, respectively, to the lens through the contact between the camera and the lens. Simultaneously therewith, it outputs a buffer signal for the signal DLC from the lens as SI, and the computer PRS inputs said SI as the data from the lens in synchronism with SCLK.

SDR designates a driving circuit for a line sensor device SNS for focus detection comprised of a CCD or the like. The driving circuit SDR is selected when signal CSDR is 'H', and is controlled from the computer PRS by the use of SO, SI and SCLK.

Signal CK is a clock for producing CCD driving clocks $\phi 1$ and $\phi 2$, and signal INTEND is a signal which informs the computer PRS that the accumulating operation has been completed.

The output signal OS of the sensor device SNS is a time-serial image signal synchronized with the clocks $\phi 1$ and $\phi 2$, and is amplified by an amplifier circuit in the driving circuit SDR, whereafter it is output as AOS to the computer PRS. The computer PRS receives AOS as an input from the analog input terminal thereof, and A/D-converts it by the A/D converting function therein in synchronism with CK, whereafter the computer PRS stores it in a predetermined address of the RAM.

SAGC which also is the output signal of the sensor device SNS is the output of a sensor for AGC (auto gain control) in the sensor device SNS, and is input to the driving circuit SDR for use for the control of the image signal accumulation in the sensor device SNS.

SPC denotes a photometering sensor for exposure control which receives the light from an object passed through the photo-taking lens, and the output SSPC thereof is input to the analog input terminal of the computer PRS and is A/D-converted, whereafter it is used for automatic exposure control (AE) in accordance with a predetermined program.

DDR designates a switch detection and display circuit which is selected when signal CDDR is 'H', and is controlled from the computer PRS by the use of SO, SI and SCLK. That is, it changes over the display of the display member DSP of the camera on the basis of data sent from the computer PRS, and informs the computer PRS of the ON or OFF state of the various operating members of the camera by communication.

Switches SW1 and SW2 are switches operatively associated with a release button, not shown. The switch SW1 is adapted to be closed by the first-stage depression of the release button, and the switch SW2 is adapted to be closed by the second-stage depression of the release button. The computer PRS, as will be described later, performs the photometering and the automatic focus adjusting operation upon closing of the switch SW1, and performs exposure control and winding-up of the film with the closing of the switch SW2 as a trigger. The switch SW2 is connected to the "interruption input terminal" of the microcomputer PRS, and even when the program during the closing of the switch SW1 is being executed, interruption is exerted by the closing of the switch SW2, whereby a shift can be immediately made to a predetermined interruption program.

MTR1 denotes a film feeding motor, and MTR2 designates a motor for driving the mirror up and charging the down and shutter spring. Control of the forward and reverse rotations of these motors is effected by their respective driving circuits MDR1 and MDR2. Signals M1F, M1R, M2F and M2R input to the driving circuits MDR1 and MDR2 are signals for controlling the motors.

MG1 and MG2 denote magnets for starting the movement of the aperture opening blades and the aperture closing blades of the shutter, and these magnets are electrically energized by signals SMG1 and SMG2 and amplifying transistors TR1 and TR2, and shutter control is effected by the computer PRS.

The switch detection and display circuit DDR, the motor driving circuits MDR1, MDR2 and shutter control have no direct relation with the present invention and therefore need not the described in detail.

Signal DCL input to a control circuit LPRS in the lens in synchronism with LCK is command data from the camera to the lens FLNS, and the operation of the lens for the command is predetermined.

The control circuit LPRS analyzes the command in accordance with a predetermined procedure, and effects the focus adjusting operation and the aperture control operation as well as the outputting of the various parameters of the lens (such as the full open F-number, the focal length and the coefficient of the defocus amount vs. the amount of axial movement) as an output DLC.

An example of a zoom lens is shown in the embodiment, and when a command for focus adjustment is sent from the camera, a focus adjusting motor LMTR is driven by signals LMF and LMR in accordance with the amount and direction of driving sent at the same time, to thereby move the optical system in the direction of the optic axis and accomplish focus adjustment. The amount of movement of the optical system is monitored by the pulse signal SENCF of an encoder ENCF and is counted by a counter in the control circuit LPRS, and at a point of time thereat a predetermined movement has been completed, the control circuit LPRS itself renders signals LMF and LMR into 'L' and brakes the motor LMTR.

Therefore, once the command for focus adjustment has been sent from the camera, the control device PRS in the camera need not at all be concerned in lens driving until lens driving is completed.

Also, when a command for aperture control has been sent from the camera, a stepping motor DMTR (conventional for aperture driving) is driven in accordance with the number of aperture steps sent at the same time. The stepping motor is capable of open control and therefore does not require an encoder for monitoring the operation thereof.

ENCZ designates an encoder circuit annexed to the zoom optical system, and the control circuit LPRS in the lens receives as an input a signal SENCZ from the encoder circuit ENCZ and detects the zoom position. Lens parameters at respective zoom positions are stored in the control circuit LPRS in the lens, and when there is a demand from the computer PRS of the camera, a parameter corresponding to the current zoom position is delivered to the camera.

The operation of the camera constructed as described above will now be described with reference to the flow charts of FIGS. 5 and so on.

When a power source switch, not shown, is closed, the supply of electric power to the microcomputer PRS is started and the computer PRS starts to execute the sequence program stored in the ROM.

Figure 5:
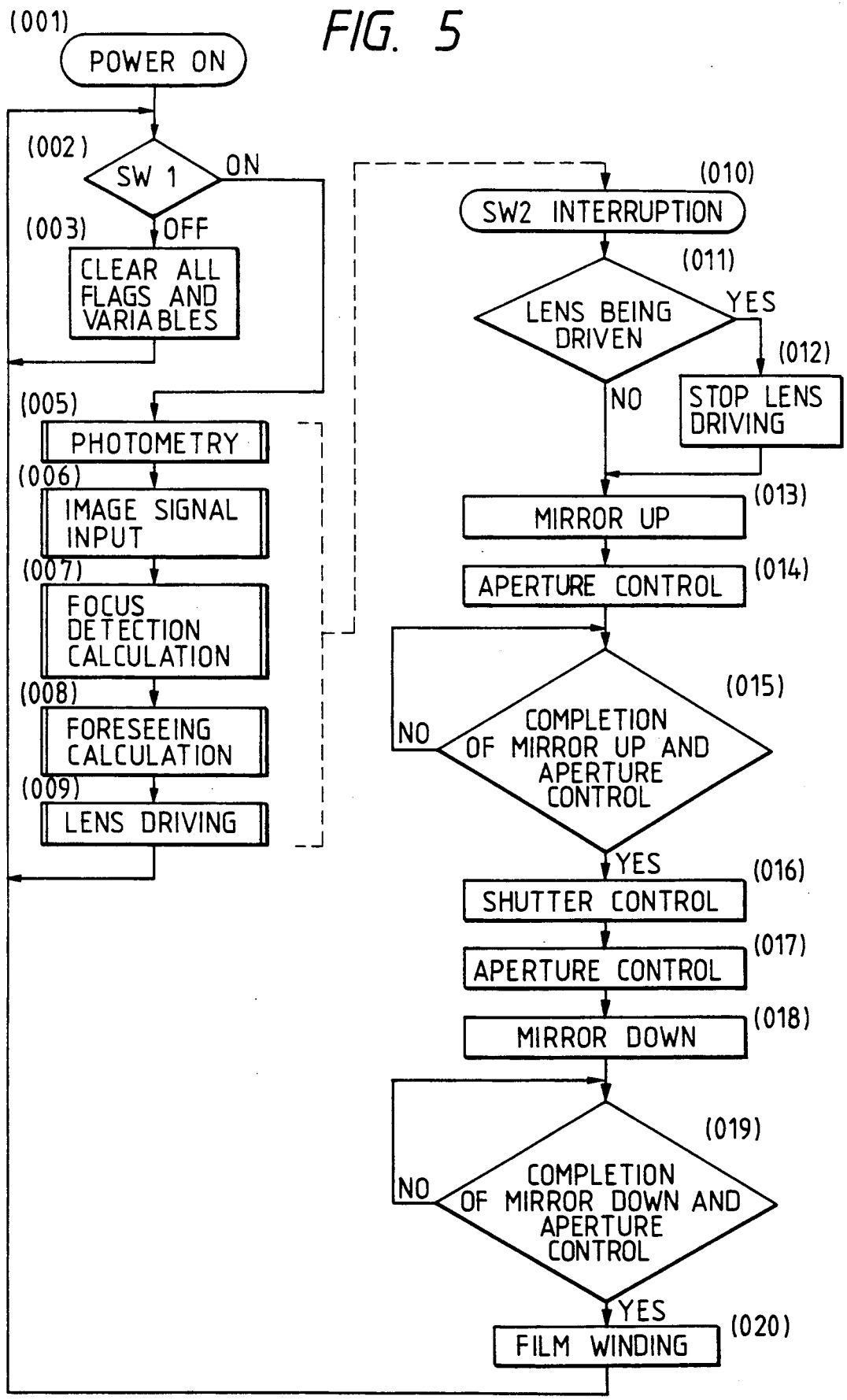
FIG. 5 is the main flow chart of the focus adjusting device of the present invention.

FIG. 5 is a flow chart showing the general flow of said program. When the execution of the program is started by said operation, via step (001) and at step (002), the state of the switch SW1 adapted to be closed by the first-stage depression of the release button is detected, and if the switch SW1 is OFF, a shift is made to step (003), where all flags and variables for control set in the RAM in the computer PRS are cleared and initialized.

The steps (002) and (003) are repetitively executed until the switch SW1 becomes ON or the power source switch becomes OFF. By the switch SW1 becoming ON, a shift is made from the steps (002) to step (005).

At the step (005), the "photometry" sub-routine for exposure control is executed. The computer PRS inputs the output SSPC of the photometering sensor SPC shown in FIG. 4 to the analog input terminal, effects A/D conversion, calculates an optimum shutter control value and an optimum aperture control value from the digital photometric value, and stores them at predetermined addresses of the RAM. During the release operation, control of the shutter and the aperture is effected on the basis of these values.

Figure 6:
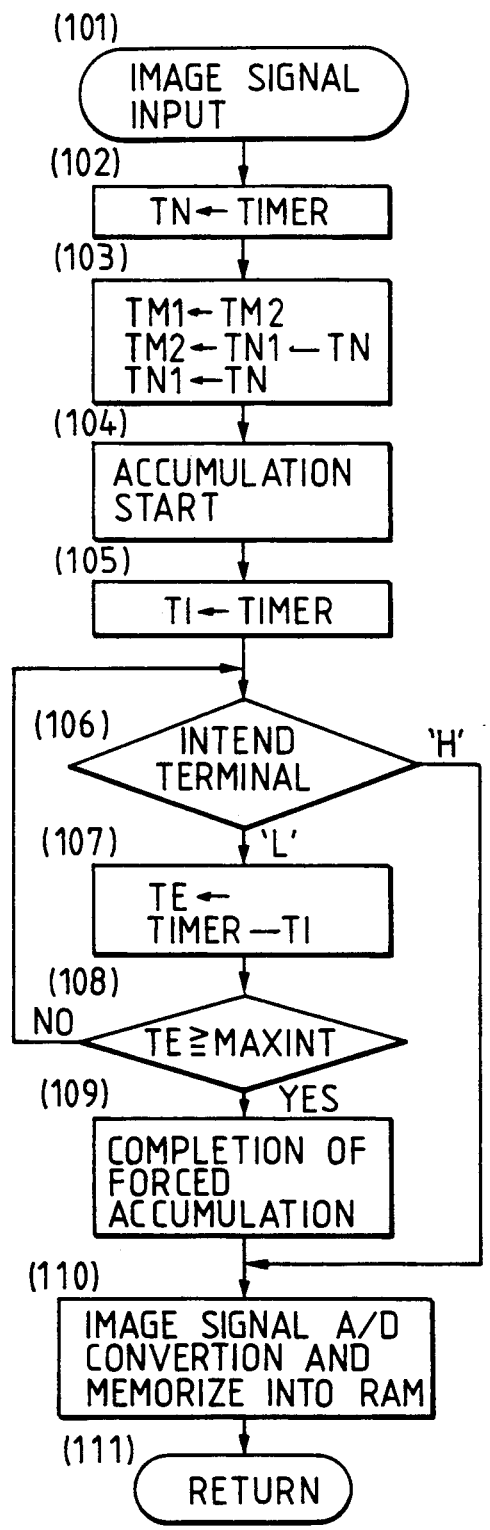
FIG. 6 is the flow chart of the "image signal input" sub-routine in the flow of FIG. 5.

Subsequently, at step (006), the "image signal input" sub-routine is executed. The flow of this sub-routine is shown in FIG. 6, and the computer PRS effects the inputting of an image signal from the sensor device SNS for focus detection. The details will be described later.

At the next step (007), the defocus amount DEF of the photo-taking lens is calculated on the basis of the input image signal. A specific calculation method is disclosed in Japanese Patent Application No. 61—160824 by the assignee of the present application and therefore need not be described in detail.

At step (008), the "foreseeing calculation" sub-routine is executed. In this "foreseeing calculation" sub-routine, correction of the amount of lens driving is effected, and the details thereof will be described later.

Figure 7:
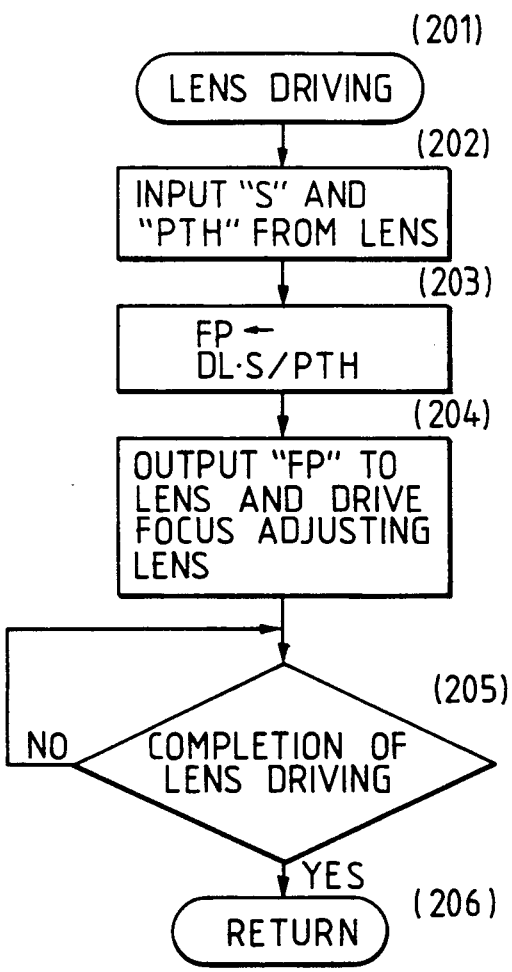
FIG. 7 is the flow chart of the "lens driving" sub-routine in the flow of FIG. 5.

At the next step (009), the "lens driving" sub-routine is executed, and lens driving is effected on the basis of the amount of lens driving corrected at the previous step (008). The flow of this "lens driving" sub-routine is shown in FIG. 7. After the completion of lens driving, a return is made to the step (002), and the steps (005)–(009) are repetitively executed until the switch SW1 becomes OFF or the second stroke switch SW2 becomes ON, whereby preferable focus adjustment is accomplished even for a moving object.

Now, when the release button is further depressed to close the switch SW2, a shift is immediately made from any step to step (010) by the interrupting function and the release operation is started.

At step (011), whether lens driving is being executed is discriminated, and if lens driving is going on, a shift is made to step (012), where a command for stopping lens driving is delivered to stop the lens, and an advance is made to step (013), and if the lens is not being driven, a shift is immediately made to step (013).

At the step (013), the mirror up movement of the quick return mirror of the camera is effected. This is executed by controlling the motor controlling signals M2F and M2R shown in FIG. 4. At the next step (014), the aperture control value already stored in the photometry sub-routine of the previous step (005) is delivered as signal SO to the control circuit LPRS in the lens through the circuit LCM to thereby effect aperture control.

Whether the mirror up movement and the aperture control of the steps (013) and (014) have been completed is detected at step (015), and the mirror up movement can be confirmed by a detecting switch, not shown, which is annexed to the mirror, and the aperture control is confirmed by communication as to whether the lens has been driven to a predetermined aperture value. If one of the mirror up movement and the aperture control is not yet completed, the program stands by at this step and the detection of the state is continuously effected. When the completion of the two is confirmed, a shift is made to step (016).

At the step (016), control of the shutter is effected at the shutter time already stored in the photometry sub-routine of the previous step (005) and the film is exposed.

When the control of the shutter is completed, at step (017), a command for making the aperture open is sent to the lens by the aforementioned communication operation, and subsequently at step (018), mirror down movement is effected. The mirror down movement, like the mirror up movement, is executed by controlling the motor MTR2 by the use of the motor controlling signals M2F and M2R.

At the next step (019), as at the step (015), the completion of the mirror down movement and the aperture opening is waited for. When the mirror down movement and the aperture opening control are both completed, a shift is made to step (020).

At the step (020), the film is wound up by one frame by properly controlling the motor controlling signals M1F and M1R shown in FIG. 4.

What has been described above is the general sequence of the camera in which foreseeing AF has been carried out.

A description will now be given of the "image signal input" sub-routine shown in FIG. 6.

The "image signal input" sub-routine is an operation executed at the beginning of a new focus detecting operation, and when this sub-routine is called, via step (101) and at step (102), the timer value TIMER of the self-running timer of the microcomputer PRS itself is stored in a memory area TN in the RAM, whereby the starting time of the focus detecting operation is memorized.

At the next step (103), the time intervals $TM_1$ and $TM_2$ in the lens driving amount correction equations (6), (7) and (9) are renewed. Before the step (103) is executed, the time intervals in the before-last and last focus detecting operations are stored in memories $TM_1$ and $TM_2$, and the time when the last focus detecting operation has been started is stored in $TN_1$.

Consequently, $TN_1-TN$ at the step (103) represents the time interval from the last to the current focus detecting operation, and this is stored in the memory $TM_2$. Also, the data immediately before $TM_2 \leftarrow TN_1-TN$ is executed, i.e., the time interval from the before-last to the last focus detecting operation, is stored in the memory $TM_1$. The current focus detection starting time TN is stored in $TN_1$ for the next focus detecting operation. At this step (103), the before-last time interval data is always stored in the memory $TM_1$, and the last time interval data is stored in the memory $TM_2$.

Now, at the next step (104), the sensor device SNS is caused to start the accumulation of optical images. More specifically, the microcomputer PRS delivers an "accumulation starting command" to the sensor driving circuit SDR by communication, and in response thereto, the driving circuit SDR renders the clear signal CLR of the photoelectric conversion element portion of the sensor device SNS into 'L' and causes the sensor device to start the accumulation of charges.

At step (105), the time value of the self-running timer is stored in a variable TI, whereby the current time is memorized.

At the next step (106), the state of the input INTEND terminal of the computer PRS is detected, and whether the accumulation has been completed is examined. The sensor driving circuit SDR renders the signal INTEND into 'L' simultaneously with the start of the accumulation, and monitors the AGC signal SAGC from the sensor device SNS, and when this signal SAGC reaches a predetermined level, the sensor driving circuit SDR renders the signal INTEND into 'H' and at the same time, renders the charge transfer signal SH into 'H' for a predetermined time, and transfers the charges of the photoelectric conversion element portion to the CCD portion.

If at step (106), the INTEND terminal is 'H', it means that the accumulation has been completed, and a shift is made to step (110), and if the INTEND terminal is 'L', it means that the accumulation is not yet completed, and a shift is made to step (107).

At the step (107), the time TI memorized at the step (105) is subtracted from the timer value TIMER of the self-running timer and the result is stored in a variable TE. Thus, the time from after the accumulation has been started until the present, i.e., the so-called accumulation time, is stored in the variable TE. At the next step (108), TE is compared with a constant MAXINT, and if TE is less than MAXINT, a return is made to step (106), where the completion of the accumulation is again waited for. When TE becomes equal to or greater than MAXINT, a shift is made to step (109), where the accumulation is forcedly completed. The completion of forced accumulation is executed by delivering an "accumulation completion command" from the computer PRS to the circuit SDR. When the "accumulation completion command" is sent from the computer PRS to the circuit SDR, the circuit SDR renders the charge transfer signal SH into 'H' for a predetermined time and causes the chargers of the photoelectric converting portion to be transferred to the CCD portion. In the flow up to the step (109), the accumulation in the sensor is completed.

At step (110), the A/D conversion of a signal AOS obtained by amplifying the image signal OS of the sensor device SNS by the sensor driving circuit SDR and the storage of the digital signal thereof in the RAM are effected. More particularly, the driving circuit SDR produces CCD driving clocks $\phi 1$ and $\phi 2$ in synchronism with the clock CK from the computer PRS and imparts them to the sensor device SNS, and the sensor device SNS has its CCD portion driven by the clocks $\phi 1$ and $\phi 2$ and the charges in the CCD are time-serially output as an image signal from the output OS. This signal is amplified by an amplifier in the driving circuit SDR, whereafter it is input as AOS to the analog input terminal of the computer PRS. The computer PRS effects A/D conversion in synchronism with the clock CK being output by the computer PRS itself, and stores the digital image signals after A/D-conversion successively at the predetermined address of the RAM.

When the inputting of the image signal is completed in this manner, the "image signal input" sub-routine is returned to the main program at step (111).

The flow chart of the "lens driving" sub-routine is shown in FIG. 7.

When this sub-routine is executed, at step (202), communication is effected with the lens and two data "S" and "PTH" are input. "S" is the "coefficient of the defocus amount vs. the amount of axial movement of the focus adjustment lens" inherent to the photo-taking lens, and for example, in the case of a total axial movement type single lens, the entire photo-taking lens is a focus adjustment lens and therefore, S=1, and in the case of a zoom lens, each zoom position is detected by the encoder ENCZ and the value of S conforming to the zoom position is determined by the control circuit LPRS. "PTH" is the amount of axial movement of the focus adjustment lens per one of the output pulses from the encoder ENCF operatively associated with the movement of the focus adjustment lens LNS in the direction of the optic axis.

Thus, the pulse number FP representative of the value of the amount of axial movement of the focus adjustment lens converted into the output pulse number of the encoder by the defocus amount DL converted into the amount of driving of the lens to be focus-adjusted and said S and PTH, i.e., the so-called amount of lens driving, is given by the following equation:

$$FP = DL \times S/PTH$$

Step (203) executes the above equation as it is.

At step (204), FP found at the step (203) is delivered to the lens to thereby command the driving of the focus adjustment lens (in the case of a total axial movement type single lens, the entire photo-taking lens).

At the next step (205), communication is effected with the lens to detect whether the driving by the amount of lens driving FP commanded at the step (204) has been completed, and when the driving is completed, a shift is made to step (206), where the "lens driving" sub-routine is returned to the main program. The detection of the completion of the lens driving is executed by counting the pulse signals of said encoder ENCF by the counter in the control circuit LPRS as described above, and detecting by said communication whether this count value has coincided with the amount of lens driving FP.

Figure 1:
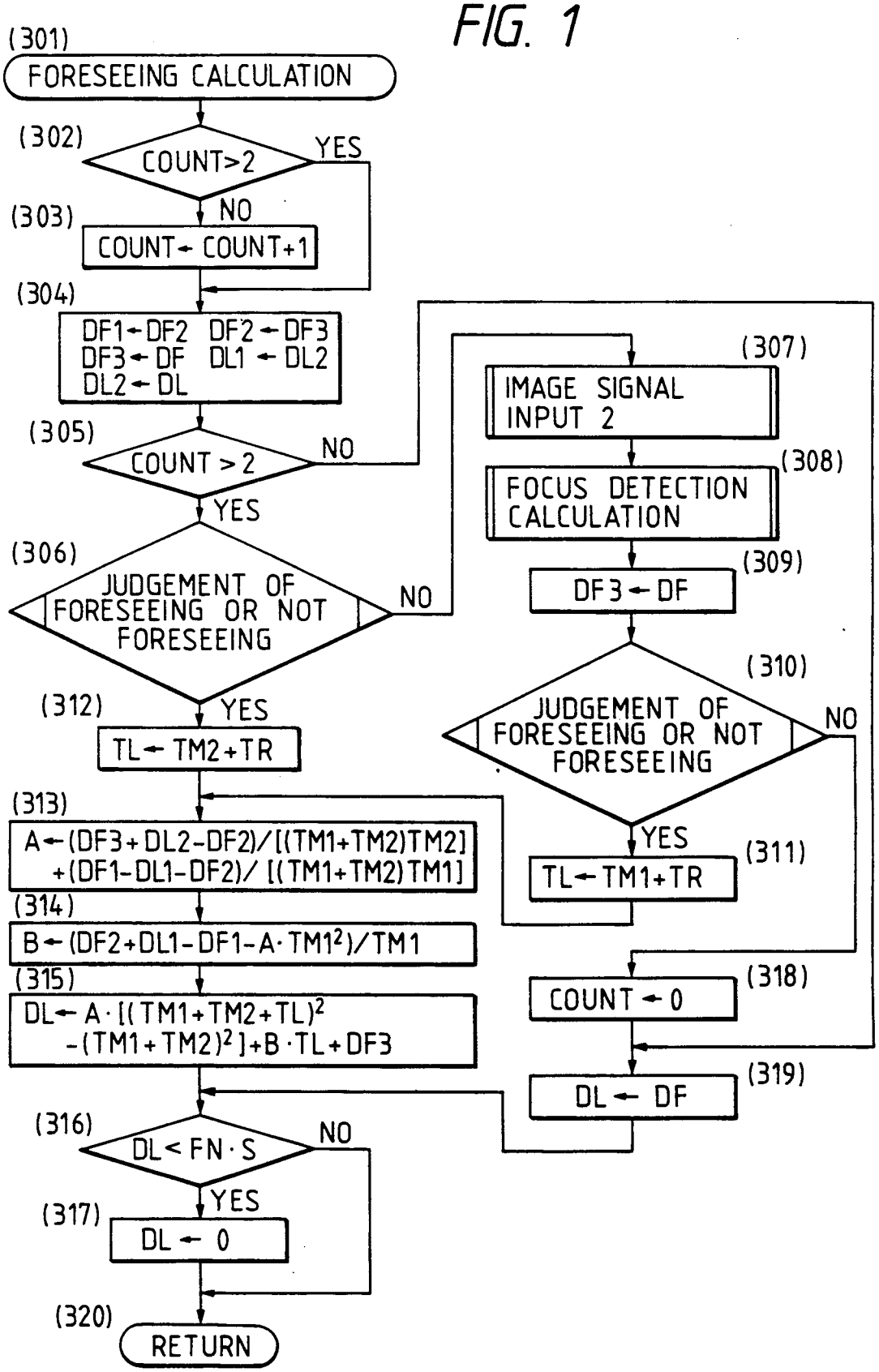
FIG. 1 is a flow chart of "foreseeing calculation" used in the focus adjusting device of the present invention.

The flow of the "foreseeing calculation" sub-routine will now be described with reference to FIG. 1. FIG. 1 shows the flow of the "foreseeing calculation" sub-routine, and this sub-routine judges the possibility or impossibility of foreseeing calculation, and if foreseeing calculation is possible, it calculates the amount of lens driving which takes the AF time lag and the release time lag into account.

At step (302), whether the counter COUNT for judging whether the accumulation of necessary data for foreseeing has been done should be counted up is judged. In the present embodiment, if three or more distance measurement data nd lens driving data are accumulated, that is, if COUNT>2, foreseeing calculation is possible and any further count up is not necessary and therefore, if COUNT>2, a shift is made to step (304). Also, if COUNT<3, COUNT is counted up at step (303), whereafter an advance is made to step (304).

At the step (304), the renewal of the data for the current foreseeing calculation is effected. That is, foreseeing calculation is effected on the basis of the equations (6), (7), (8) and (9) and therefore, as the data therefor, the current defocus amount $DF_3$ in FIG. 2, the last and before-last defocus amounts $DF_2$ and $DF_1$, the before-last amount of lens driving $DL_1$, the last amount of lens driving $DL_2$, the before-last and last time intervals $TM_1$ and $TM_2$ and the estimated time lag TL are required. Consequently, at the step (304), each time focus detection is effected, the currently detected defocus amount DF is input to a memory area $DF_3$ of the RAM, the last defocus amount is input to a memory area $DF_2$, and the before-last defocus amount is input to a memory area $DF_1$, and further, the amount of lens driving DL as converted into the last amount of movement of the imaging plane is input to a memory area $DL_2$ and the amount of lens driving $DL_1$ as converted into the before-last amount of movement of the imaging plane is input to a memory area $DL_1$, and the data in each memory area is renewed to the data necessary for the current foreseeing calculation.

At step (305), whether the data necessary for foreseeing calculation is input to each said memory area is discriminated. As described above, foreseeing calculation requires the current, last and before-last defocus amounts and the last and before-last amounts of lens driving, and is performed on the condition that three or more focus adjusting operations have been effected in the past. Consequently, each time the focus adjusting operation is effected at step (303), +1 is effected on the counter COUNT, and the frequency with which the focus adjusting operation has been effected is counted by the counter, thereby discriminating whether the frequency is greater than 2, that is, whether three or more operations has been effected, and if three or more operations have been effected and foreseeing calculation is possible, a shift is made to step (306), and if foreseeing calculation is impossible, a shift is made to step (319).

At the step (306), whether the currently detected defocus amount is suitable for foreseeing is judged in the "judgment of foreseeing or not foreseeing" sub-routine. If in this "judgment of foreseeing or not foreseeing" sub-routine, it is judged that the data in said memory areas used for foreseeing are not suitable for foreseeing, a shift is made to step (307), and if it is judged that said data are suitable for foreseeing, an advance is made to step (312).

If at the step (306), it is judged that said data are not suitable for foreseeing calculation and a shift is made to the step (307), foreseeing is not immediately inhibited but distance measurement is effected again, and if the data are still not suitable for foreseeing calculation, foreseeing calculation is inhibited. This is because when the photographer pursues a moving object, if the object deviates from the distance measuring field and another object is distance-measured or distance measurement is effected when another object passes in front of the main object, the defocus amount assumes a value differing from the defocus amount to be originally obtained and if it is judged thereby that the data are not suitable for foreseeing, the past three or more focus adjusting operations are necessary to effect foreseeing calculation again and it becomes impossible to resume foreseeing calculation immediately.

So, in the present embodiment, even if it is once judged that the data are not suitable for foreseeing, at the step 306, the introduction of an image signal is effected again by the "image signal input 2" sub-routine of step (307). This sub-routine will be described later. When this step is completed, a shift is made to step (308).

At the step (308), focus detection calculation is effected on the basis of the image signal obtained at the step (307), and the defocus amount DF is calculated.

At the next step (309), since it has been judged that the defocus amount $DF_3$ detected at the last time is not suitable for foreseeing calculation, this defocus amount $DF_3$ is renewed into the currently detected defocus amount DF and a shift is made to step (310).

The step (310) is the same "judgment of foreseeing or not foreseeing" sub-routine as the step (306), and if it is judged that the data are suitable for foreseeing calculation, an advance is made to step (311), where foreseeing calculation is effected, and if it is judged that the data are not suitable for foreseeing calculation, a shift is made to step (318), where foreseeing calculation is inhibited.

At the step (318), it is judged twice in succession that the data are unsuitable for foreseeing, and the counter COUNT representing the accumulated state of the data necessary for foreseeing is reset to 0 to effect the inhibition of foreseeing (resetting).

At the next step (319), the amount of lens driving DL when foreseeing calculation is not effected is calculated. Here, DL is calculated as DL=DF as in the conventional servo AF.

At step (311), the estimated time lag TL necessary to effect foreseeing calculation is calculated, and not $TM_2$ but the sum of $TM_1$ and TR (release time lag) is used as the then estimated AF time lag (the time required for focus adjustment). This is because distance measurement is effected twice within the time $TM_2$ from the last focus detection until the current focus detection and therefore the then AF time lag is estimated to be greater than the actually foreseen current AF time lag. So, in the present embodiment, use is made of the time $TM_1$ from the before-last focus detection until the last focus detection. When this step is completed, a shift is made to step (313). (But said TL need not always be $TM_1+TR$ and the amount of lens driving is considered to be longer than $TM_1$ and therefore, TL may also be $TL = (TM_1+TM_2)/2+TR$.)

Also, if it is judged at the step (306) that foreseeing is possible and a shift is made to step (312), calculation of the estimated time lag TL is effected at the step (312). The time from the last focus detecting operation until the current focus detecting operation is memorized in the memory area $TM_2$ as previously described, and under the assumption that the time required for the current focus adjustment is also coincident with $TM_2$, the time lag $TL=TM_2+TR$ is found.

At the next steps (313) and (314), A and B representing the terms a and b of the equations (6) and (7) are found on the basis of the data stored in the memory areas $DF_1-DF_3$, $DL_1$, $DL_2$, $TM_1$ and $TM_2$, and a shift is made to step (315).

At the step (315), the calculated value of the equation (9) is found on the basis of the data of each memory means and the calculated values of step (311) or (312) and steps (313) and (314), and the amount of lens driving as converted into the current amount of movement of the imaging plane is found.

At the next step (316), the amount of lens driving DL found at the step (315) is compared with the product FN·δ of the full open F-number FN of the photo-taking lens and a predetermined coefficient δ (in the present embodiment, a minimum blur circle (0.035 mm), and if DL<FN·δ, a shift is made to step (317), and if not so, a return to the main program is made at step (320).

FN·δ represents the depth of the imaging plane, and at the step (317), it is judged that the amount of lens driving DL is smaller than the depth of the imaging plane FN·δ obtained at the step (316), that is, the amount of lens driving DL is a value within the depth and even if the lens is or is not driven by DL, the focus state does not vary and lens driving is not necessary, and the amount of lens driving DL is rendered into DL=0, and lens driving is inhibited. Thus, any unnecessary minute lens driving is not effected and both the sense of use and the power consumption can be improved. Also, in the present embodiment, FN is the full open F-number of the photo-taking lens, but even if FN is the photographing aperture value, there will arise no problem, and δ is not limited to 0.035 mm. When this step is completed, this sub-routine is returned at the next step (320).

In the present embodiment, when it is judged twice in succession that the data are not suitable for foreseeing calculation, foreseeing calculation is inhibited and the accumulation of data is started again, but foreseeing may be inhibited when it is judged three or more times that the data are unsuitable.

Figure 8:
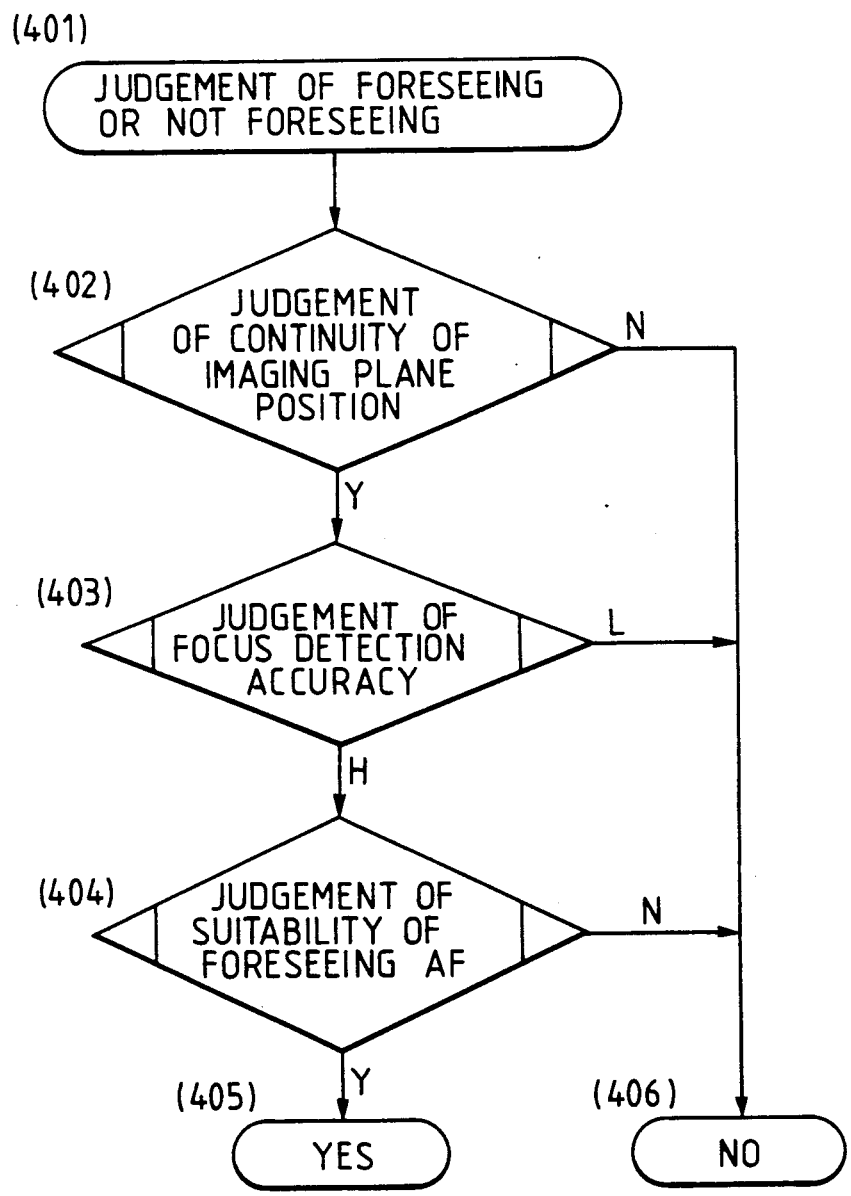
FIG. 8 is the flow chart of the "judgment of foreseeing or not foreseeing" sub-routine in the flow of FIG. 5.

The flow of the "judgment of foreseeing or not foreseeing" sub-routine will now be described. FIG. 8 shows the flow of the "judgment of foreseeing or not foreseeing" sub-routine, and step (402) is the sub-routine of "judgment of continuity of imaging plane position" for detecting the continuity of the imaging plane (the position of the object), and more particularly is a sub-routine for judging whether the camera is distance-measuring continuously for the same object, and the details thereof will be described later.

If at this step, it is judged that the imaging plane position is changing continuously, a shift is made to step (403), and if not so, it is judged that another object has been distance-measured, and an advance is made to step (406) and a return is made to the main program.

Step (403) is the "focus detection accuracy calculation" sub-routine for evaluating the reliability of the result of focus detection. At this step, whether the defocus amount used for foreseeing calculation has the reliability with which it can be used for foreseeing calculation is judged, and if it is judged that the reliability is high, a shift is made to step (404), and if it is judged that the reliability is low, a shift is made to step (406) for discontinuing foreseeing calculation and a return is made to the main program.

The step (404) is the "judgment of suitability of foreseeing AF" sub-routine for judging whether the object is an object or in a condition for which foreseeing AF is effective, and the details thereof will be described later.

At the step (404), whether foreseeing calculation is effective or whether foreseeing calculation has a reverse effect when lens driving based on the result of foreseeing calculation is effected is judged, and if the object is an object or in a photographing condition which does not require foreseeing AF, a shift is made to step (406) for discontinuing foreseeing calculation, and if the object requires foreseeing AF, a shift is made to step (405) for making foreseeing calculation possible and a return is made to the main program.

Here, in the present embodiment, evaluation is made of roughly the "continuity of the image plane position", the "focus detection accuracy" and the "suitability of foreseeing AF", and when all these conditions are satisfied, foreseeing calculation is made possible, but it is also possible to add the judgment which takes factors such as "lens driving accuracy" and "fluctuation of AF time lag" into account, or to attach importance to response and curtail the judgment items to one in order to shorten the calculation time.

Also, in the "judgment of foreseeing or not foreseeing", the order of the sub-routines of the various judgments is such that the routine requiring a shorter judgment time is executed earlier. Alternatively, the routine of higher probability with which "not foreseeing" is judged is executed earlier, whereby it becomes possible to shorten the time for the judgment of foreseeing or not foreseeing.

Figure 9:
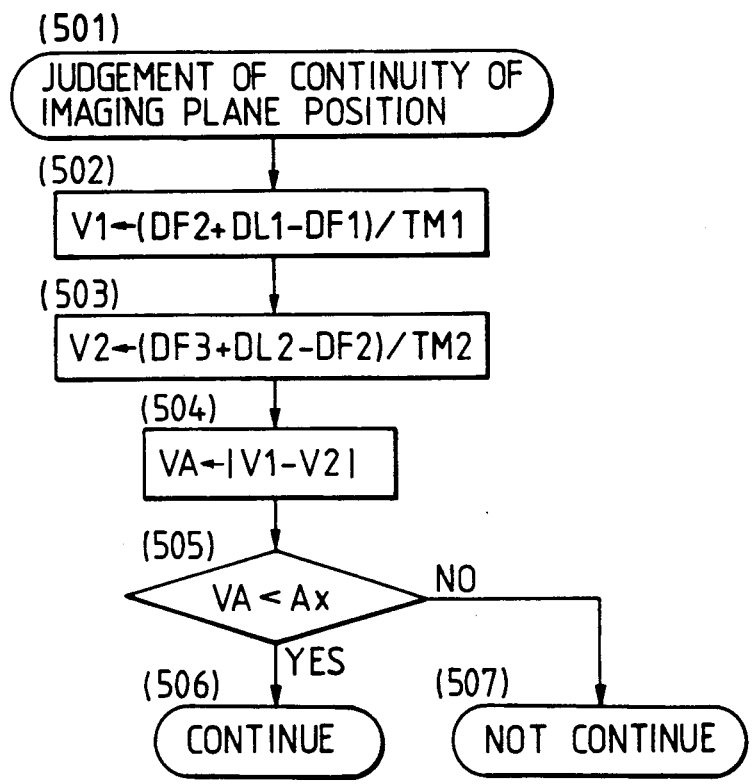
FIGS. 9, 10, 11, 12 and 13 are the flow charts of the "judgment of continuity of imaging plane position" sub-routine in the flow of FIG. 8.

The "judgment of continuity of imaging plane position" sub-routine at the step (402) of the "judgment of foreseeing or not foreseeing" sub-routine will now be described with reference to FIG. 9.

Step (502) effects a calculation $(DF_2+DL_1-DF_1)/TM_1$ on the basis of the data in each memory area. This calculation is the step of calculating the average value V1 of the movement velocity of the imaging plane between the times $t_1$ and $t_2$ of FIG. 2. The calculation at the next step (503) is likewise the step of calculating the average value V2 of the movement velocity of the imaging plane between the times $t_2$ and $t_3$. Thereafter, an advance is made to step (504).

At the step (504), the absolute value VA of the difference between the movement velocities V1 and V2 of the imaging plane found at the steps (502) and (503) is calculated, and a shift is made to step (505).

At the step (505), VA found at the step (504) is compared with a preset number AX, and when VA is greater than AX, it is judged that there is no continuity of the imaging plane position, and when VA is smaller than AX, it is judged that there is continuity of the imaging plane position.

The principle of judgment of foreseeing or not foreseeing by the above-described flow is based on the fact that if the same object is pursued, the then movement velocity of the imaging plane also varies continuously. So, adjacent movement velocities of the imaging plane in terms of time are calculated and if the difference therebetween is small, it is deemed that the movement velocity of the imaging plane is varying continuously, and it is judged that the same object is being distance-measured, and foreseeing calculation is effected. In contrast, when the variation in the movement velocity of the imaging plane is sufficiently great, it is deemed that the movement velocity of the imaging plane is no& varying continuously, and it is judged that another object has been distance-measured, and foreseeing calculation is inhibited.

Figure 10:
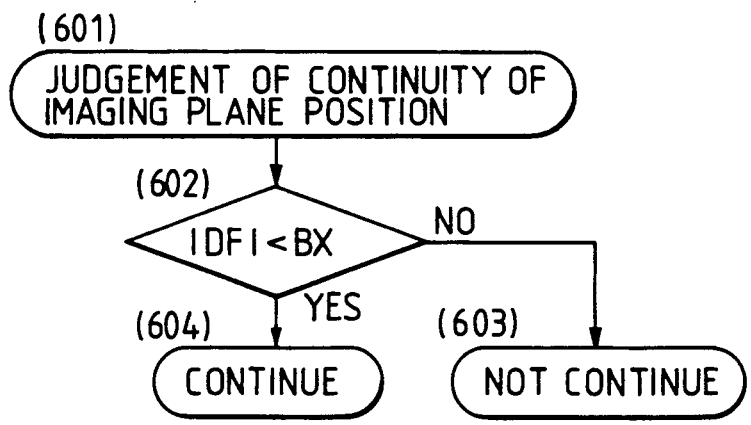

FIG. 10 shows the flow of another embodiment of the "judgment of continuity of imaging plane position" sub-routine. This judges that when the absolute value of the detected defocus amount DF has become greater than a certain value BX, another object has been distance-measured, and inhibits foreseeing calculation.

That is, it judges that in a state in which the same object is being pursued and distance-measured, the detected defocus amount rarely varies greatly and when the detected defocus amount is greater than a predetermined value, there is no continuity.

A description will now be given of the judgment of continuity of imaging plane position sub-routine using a parameter obtained by foreseeing calculation. In this case, however, said foreseeing calculation value is used and therefore, as in FIG. 1, the "judgment of foreseeing or not foreseeing" cannot be effected before the foreseeing calculation in the steps (312)–(315) is effected and therefore, it is necessary to effect the judgment of foreseeing or not foreseeing without fail after the "foreseeing calculation" by the steps (312)–(315), and it is necessary to suitably correct the flow of FIG. 1.

Figure 11:
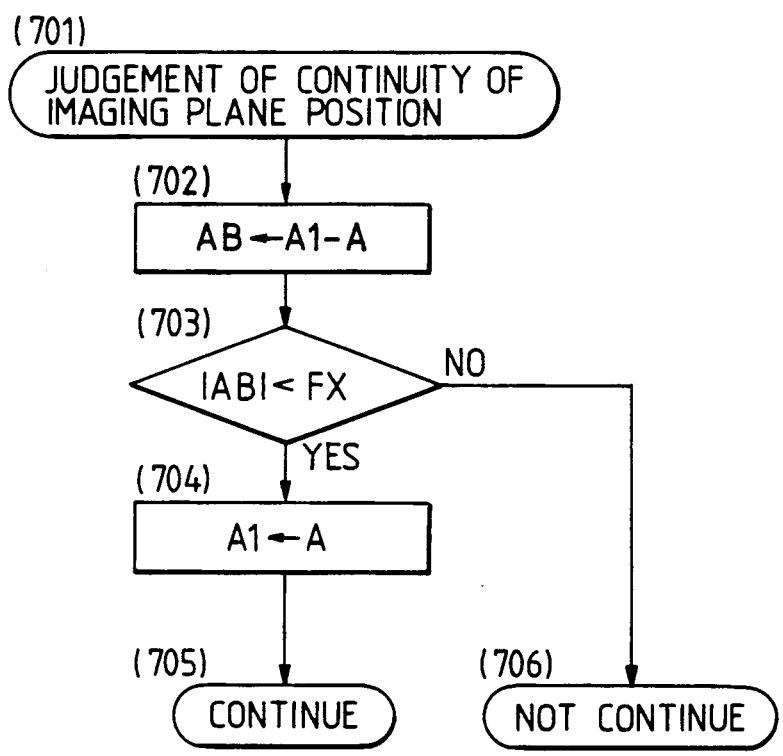

FIG. 11 is a flow chart showing an example of the "judgment of continuity of imaging plane position" sub-routine for judging the continuity by the value of the coefficient A of the secondary term obtained by the foreseeing calculation by the steps (312)–(315).

At the step (702) of FIG. 11, the difference AB between the coefficient A found by the current foreseeing calculation and the coefficient $A_1$ of the secondary term of the foreseeing function found by the last foreseeing calculation is found. However, the coefficient A is changed to $A_1$ each time a new A is found at step (704) and therefore, it is renewed each time A is found, and the coefficient A found by the last focus detecting operation is always input.

At step (703), the absolute value of said AB is compared with a predetermined value FX, and when |AB-| <FX, an advance is made to step (704), where said coefficient A is renewed and it is judged that there is continuity.

Also, when the absolute value of AB is greater than FX, a shift is made to step (706), where it is judged that there is no continuity.

The principle of judgment shown in FIG. 11 is that if the same object is being distance-measured, the imaging plane position changes continuously and at this time, it is deemed that the coefficient of the foreseeing function also varies continuously, and the variation in the coefficient A of the secondary term of the foreseeing function is examined and when the variation in the value of A is small, it is judged that foreseeing is possible. Here, attention has been paid only to the coefficient A of the secondary term, but judgment may also be done from the variation in the coefficient B of the primary term or the coefficients of the primary and secondary terms. That is, the term a or b of the foreseeing function x(t) of FIG. 2 does not vary very greatly for the same object during each focus detecting operation and therefore, the magnitude of the variation rate of the term a or b is detected and judgment of the continuity of the imaging plane position is effected.

Figure 12:
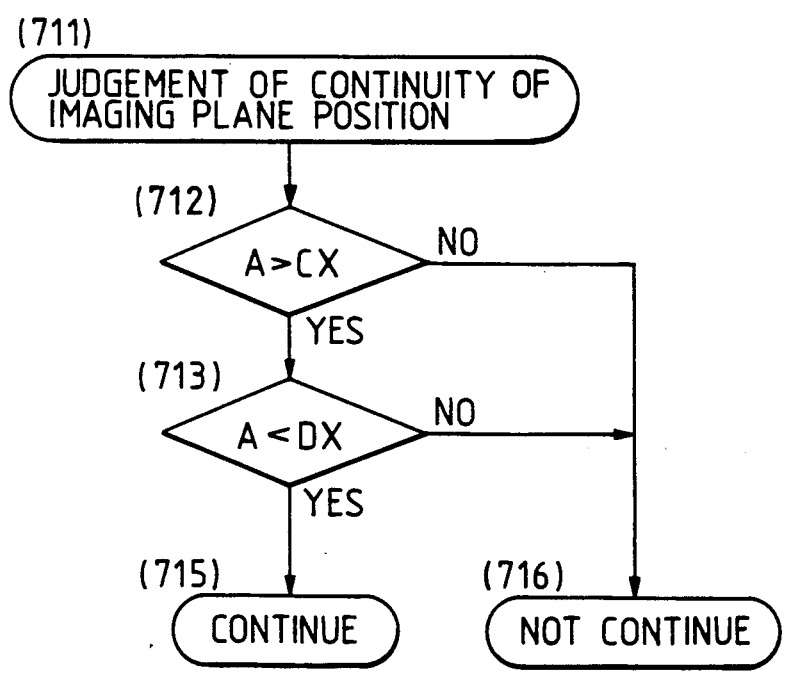

FIG. 12 shows another example of the "judgment of continuity of imaging plane position" sub-routine, and the flow thereof will hereinafter be described.

The principle of FIG. 12 pays attention to the fact that when the object being distance-measured shifts to another object in the course of distance measurement, the influence thereof presents itself better in the secondary term A of said foreseeing function than in the primary term B and the absolute value of A becomes very great, and whether there is continuity is judged by the absolute value of A.

If at step (712), the coefficient A of the secondary term of the foreseeing function is greater than a certain number CX, an advance is made to step (713), and if not so, a shift is made to step (716), where it is judged that there is no continuity. The arbitrary number CX is a negative number.

At step (713), when the coefficient A of the secondary term of the foreseeing function is greater than a certain number DX, it is judged that there is no continuity, and an advance is made to step (716), and when A is smaller than DX, a shift is made to step (715), where it is judged that there is continuity. DX is a positive number.

Figure 13:
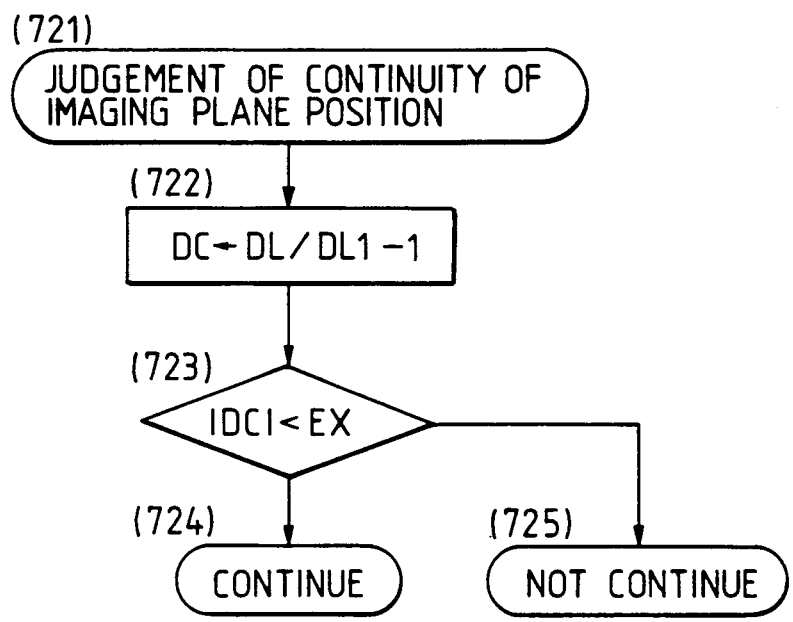

FIG. 13 is a flow showing another example of the "judgment of continuity of imaging plane position" sub-routine, and this flow judges from a variation in the amount of lens driving whether foreseeing is possible. In this flow, the last amount of lens driving $DL_1$ is compared with the current amount of lens driving DL and if the variation rate thereof is greater than a certain number EX, it is judged that there is no continuity. Here, evaluation may be made from not the variation rate, but the variation amount.

In all the above-described embodiments, whether distance measurement is being effected for the same object is judged by the continuity of the movement velocity of the imaging plane or the change in the imaging plane position, but it is apparent that the present invention is also effective using judgment means comprising a combination of these embodiments. Also, as entirely different judgment means, it is possible to compare the last image signal with the image signal currently obtained by distance measurement, and effect foreseeing calculation when it is judged that the two image signals are those of the same object.

Also, the operations of judging the continuity of the imaging plane position shown in FIGS. 12 and 13 also use the data obtained as a result of foreseeing calculation and therefore, as in the judging operation of FIG.

11, it is necessary to effect these judging operations subsequently to the step (315) of FIG. 1.

Figure 14:
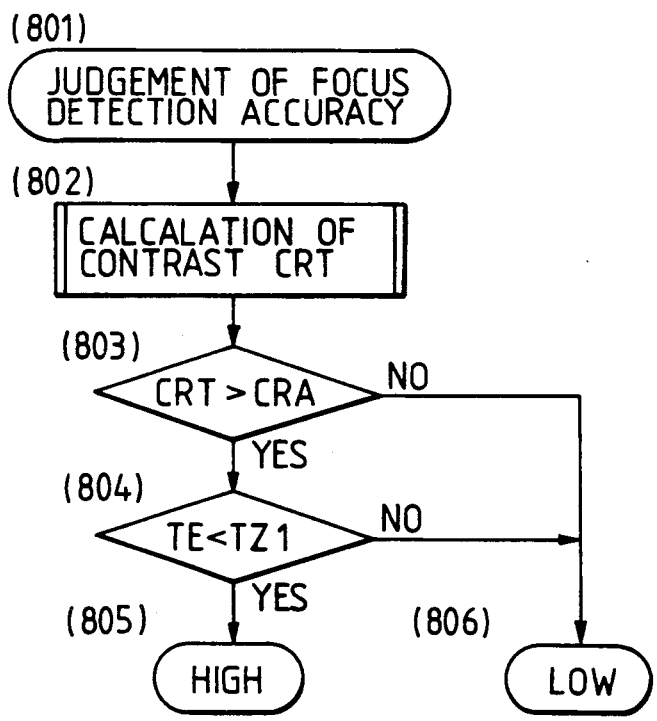
FIG. 14 is the flow chart of the "judgment of focus detection accuracy" sub-routine in the flow of FIG. 8.

The flow of the "judgment of focus detection accuracy" sub-routine will now be described with reference to FIG. 14.

Step (802) is the "contrast calculation" sub-routine for calculating the contrast value CRT with respect to the image signals introduced at the step (006) of FIG. 5 and the step (307) of FIG. 1, and the method of calculating the contrast value is known and need not be described herein.

At the next step (803), the contrast value CRT found at the step (802) is compared with a certain number CRA, and if CRT > CRA, it is judged that the contrast of the image signals is great and the focus detection accuracy also is high, and a shift is made to step (804), and if not so, it is judged that the focus detection accuracy is low, and an advance is made to step (806) and a return is made to the main program.

At the step (804), the accumulation time TE of the image signals is compared with a certain number $TZ_1$, and if $TE < TZ_1$, it is judged that the accumulation time is short and the focus detection accuracy is high, and an advance is made to step (805) and a return is made to the made program, and if not so, it is judged that the imaging plane may move greatly during the accumulation time and the reliability of the result of focus detection is low, and time advance is made to step (806) and a return is made to the main program.

In the present embodiment, the focus detection accuracy has been evaluated by only the contrast and the accumulation time, but alternatively, the reliability of the result of focus detection may be evaluated by other methods, for example, by the degree of coincidence between two images or the reliability threshold value of the abnormality or the like of the image signal caused by ghost images or the like.

The flow of the "judgment of suitability of foreseeing AF" sub-routine will now be described with reference to FIG. 15.

At step (902), in order to renew the data of a parameter $LX_1$ indicative of the before-the-before-last and before-last reversal and non-reversal of the direction of lens driving, the value of $LX_2$ is moved to $LX_1$. This is a process for inputting the value of $LX_2$ indicative of the before-the-before-last and before-last reversal and non-reversal of the direction of lens driving to $LX_1$ in the current judgment to effect the current judgment because the data used in the last judgment of suitability of foreseeing AF remains in $LX_1$.

At the next step (903), LX is calculated from the before-last amount of lens driving $DL_1$ and the last amount of lens driving in the following manner:

$$LX = |DL_2| - |DL_2 - DL_1|$$

At step (904), the before-last and last reversal and non-reversal of the direction of lens driving are judged from LX obtained at the step (903). Here, if LX > 0, it means that $|DL_2| > |DL_2 - DL_1|$, and this is established when $DL_2$ and $DL_1$ are of the same sign. That is, the condition that LX > 0 is a state in which the direction of lens driving is not reversed. In contrast, the case where LX < 0 can be judged as the direction of lens driving being reversed. If at this step, it is judged that the direction of lens driving is not reversed, a shift is made to step (906), and if it is judged that the direction of lens driving is reversed, a shift is made to step (905).

At the step (906), "0" indicative of non-reversal is input to a parameter $LX_2$ indicative of the before-last and last reversal and non-reversal of the direction of lens driving, and at the step (905), "1" indicative of reversal is input to the parameter $LX_2$.

At the next step (907), whether the direction of lens driving has been reversed twice in succession is judged. If $LX_1 + LX_2 = 2$, that is, if $LX_1 = 1$ and $LX_2 = 1$, it means that the direction of lens driving has been reversed twice in succession, and it is deemed that such a state is not an object or a condition suitable for foreseeing AF, and an advance is made to step (912) and a return is made to the main program.

In contrast, if the direction of lens driving has not been reversed in succession, it is deemed that such a state is suitable for foreseeing AF, and an advance is made to step (908).

The step (908) is a sub-routine for effecting the detection of the distance between the object and the camera, and as a method therefor, there is conceivable the measurement by an extraneous distance measuring device such as active AF or a method of directly finding the object distance by providing means for finding the object distance from the focal length and the axially moved position of the photo-taking lens and the defocus amount and an encoder for detecting the absolute position of the lens, but the details thereof are omitted herein.

At the next step (909), a value LZ obtained by dividing the distance DZ between the object and the camera found at the step 908 by the focal length FL of the photo-taking lens is calculated. The focal length FL is determined by the control circuit LPRS in conformity with the zoom state detected by the encoder ENCZ, and is input to the computer PRS of the camera.

At step (910), if the value LZ found at the step (909) is LZ < 200, it is judged that the object is an object suitable for foreseeing, and an advance is made to step (911) and return is made to the main program. If LZ is not LZ < 200, it is judged that the probability with which the movement velocity of the imaging plane is great is low and foreseeing AF is not necessary, and an advance is made to step (912) and a return is made.

Here, in the judgment of the distance between the object and the camera, the standard has been 200 times the focal length of the photo-taking lens, but this may be another value or a value variable by the movement velocity of the object or by the lens and the luminance of the object.

Also, in the present embodiment, a judgment is made from the reversal and non-reversal of the direction of lens driving and the distance between the object and the camera, but alternatively, the judgment may be made from one of these judgment means.

Further, in the present embodiment, if the direction of lens driving has been reversed twice in succession, it is judged that the object is unsuitable for foreseeing, but there are relatively many scenes to be photographed in which there is one reversal of the direction of lens driving, and for example, when a swing is to be photographed or persons or vehicles pass by the photographer, the direction of lens driving is reversed once. If in such a case, foreseeing is immediately inhibited, much time will be taken before the next foreseeing is effected, and this will result in missing a shutter opportunity and therefore, in the present embodiment, foreseeing is inhibited when the direction of lens driving has been reversed twice in succession, but alternatively, the design may be made such that when the direction of lens driving has been reversed more than twice, for example, three times or four times, it is judged that the object is unsuitable for foreseeing.

The flow of the "image signal input 2" sub-routine of step (307) will now be described with reference to FIG. 16.

Figure 16:
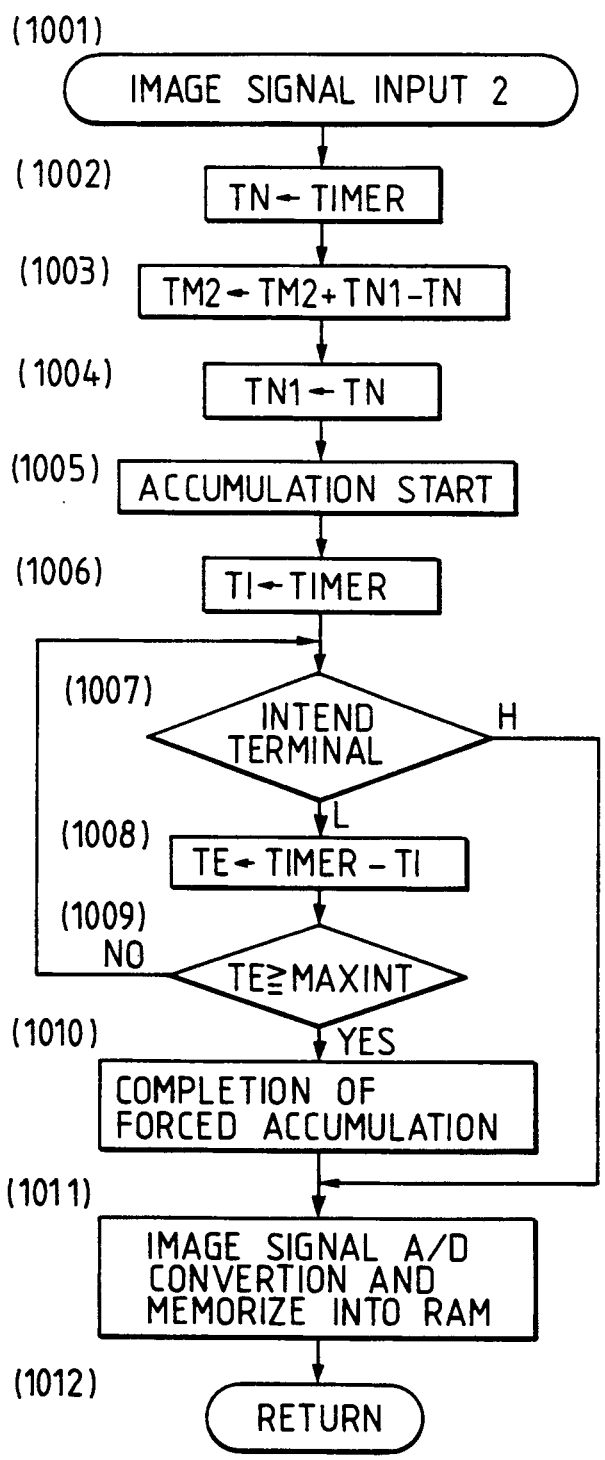
FIG. 16 is the flow chart of the "image signal input 2" sub-routine in the flow of FIG. 5.

The flow of the sub-routine of FIG. 16 is entirely the same as the "image signal input" sub-routine of FIG. 6 except for steps (1003) and (1004), and here, a description will be given of only the steps (1003) and (1004).

The step (1003) is a step for calculating the time interval $TM_2$ from the last to the current distance measurement, and in this case, the defocus amount $DF_3$ obtained by the "image signal input" at step (006) and the "focus detection calculation" at step (007) is judged as being inappropriate for foreseeing calculation and therefore, the time interval from the before-last to the current distance measurement must be $TM_2$. Accordingly, the sum of the time interval $TM_2$ from the before-last to the last distance measurement and the time interval $TN_1-TN$ from the last to the current distance measurement is $TM_2$.

At the next step (1004), the current distance measurement starting time TN is input to $TN_1$, and a shift is made to the following flow.

Figure 17:
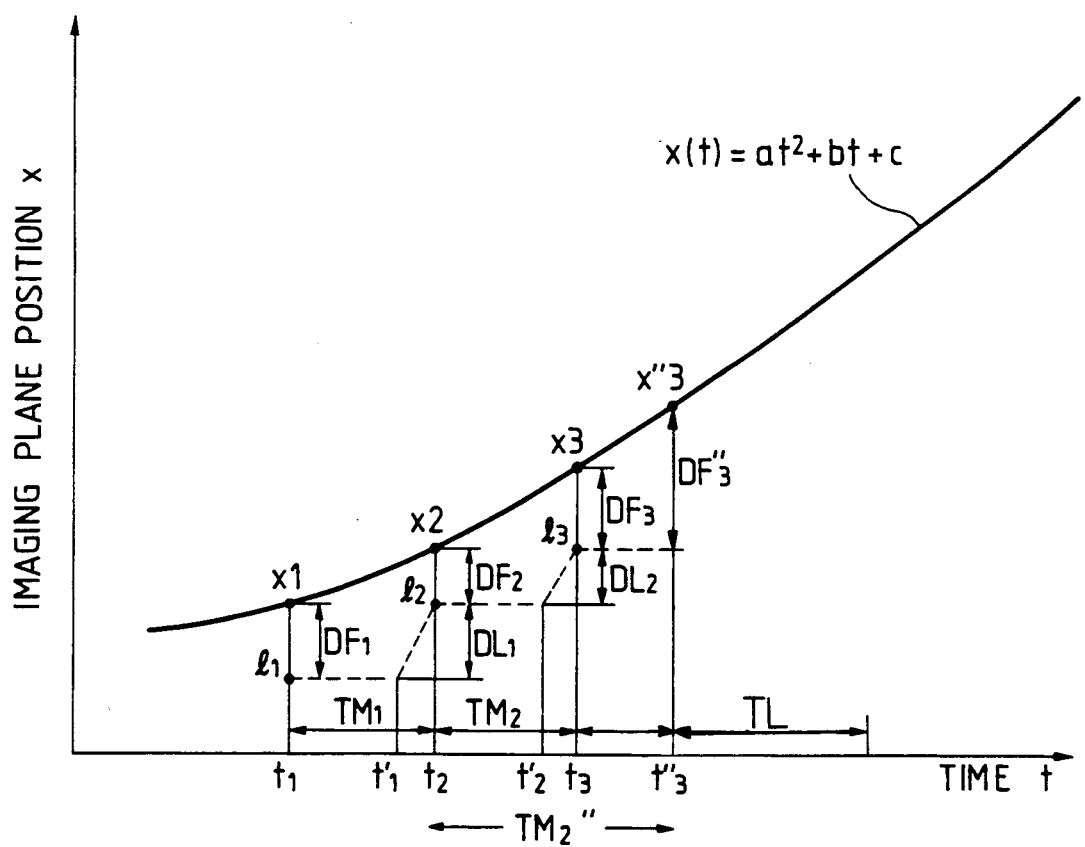
FIG. 17 illustrates the operation of the "image signal input 2" sub-routine.

That is, the "image signal input 2" sub-routine, as shown in FIG. 17, is executed when for example, the defocus amount $DF_3$ based on the image signal at $t_3$ is judged as being unsuitable for foreseeing and therefore, to effect the foreseeing calculation in the steps (313)-(315) of FIG. 1 on the basis of the image signal in the "image signal input 2", it is necessary that the "defocus amount $DF_3$" obtained of the operation by the "image signal input 2" be processed as the data replacing $DF_3$. Consequently, it is necessary that the time from after the detection of the last defocus amount $DF_2$ has been effected until the detection of said $DF_3''$ is effected, i.e., $t_2-t_3"=TM_2"$, be processed as the last to the current time interval data $TM_2$, and this processing is effected at the step (1003). Also, when the "image signal input 2" sub-routine has been executed, at the step (309) of FIG. 1, $DF_3 \leftarrow DF$ is effected as previously described in order to process said $DF_3"$ as the data replacing $DF_3$, and $DF_3"$ is processed as $DF_3$.

Furthermore, if TL when the "image signal input 2" sub-routine is executed is processed as $TM_2+TR$, $TM_2$ will become longer than in the usual case as described above and therefore, in this case, at the step (311) of FIG. 1, TL is processed as $TM_1+TR$ and is rendered into the processed data at the steps (313)-(315), whereby foreseeing calculation is effected.

The auto focus operation using the foreseeing calculation of the present invention is executed by the above-described flows, and the outline thereof will hereinafter be described.

Upon closing of the switch $SW_1$, the flow of FIG. 5 is executed. In this case, at steps (006) and (007), the detection of the image signal and the calculation of the defocus amount are effected and a shift is made to step (008). In the foreseeing calculation of the step (008), as shown in FIG. 1, steps (305) to (319), (316) and (317) are executed until said detection of the image signal and said calculation of the defocus amount are effected three times, and the lens driving of the next step (009) is effected. Accordingly, the first and second focus detecting operations and lens driving are effected in accordance with the defocus detected at that point of time.

Also, when the third and subsequent focus detecting operations are effected, step (306) is executed subsequently to the step (305) of FIG. 1, and when it is judged at this step that foreseeing is possible, steps (312)-(317) are executed, and in the manner described previously the foreseen imaging plane position is calculated on the basis of the past data, and the amount of lens driving DL to this position is found. Consequently, in the third and subsequent focus detecting operations, the amount of driving to said foreseen imaging plane position is found, and by the lens driving of step (009), the lens is driven to said foreseen position.

If at step (306), "not foreseeing" is judged in the flow described with reference to FIGS. 8-15 when the lens driving to said foreseen imaging plane position is being effected, a shift is made to step (307), where the "image signal input 2" sub-routine of FIG. 16 is executed, and through steps (308) and (309), a shift is made to step (310). At this step (310), whether foreseeing is possible is judged again on the basis of the defocus amount, etc. obtained by said "image signal input 2". When as a result, it is judged that foreseeing is possible, through step (311), a shift is made to the steps subsequent to the aforementioned step (313). Consequently, thereafter, the lens driving to the foreseen imaging plane position is continued.

On the other hand, when at the step (310), "not foreseeing" is judged again, it means that "not foreseeing" has been judged twice in succession and therefore, instead of the lens driving using said foreseeing process, a shift is made to step (316) through steps (318) and (319). Accordingly, in this case, lens driving is effected on the basis of the defocus amount obtained in the "image signal input 2" sub-routine. Thereafter, a return is made to the first focus detecting operation, and the above-described operation is repetitively executed.

Figure 18:
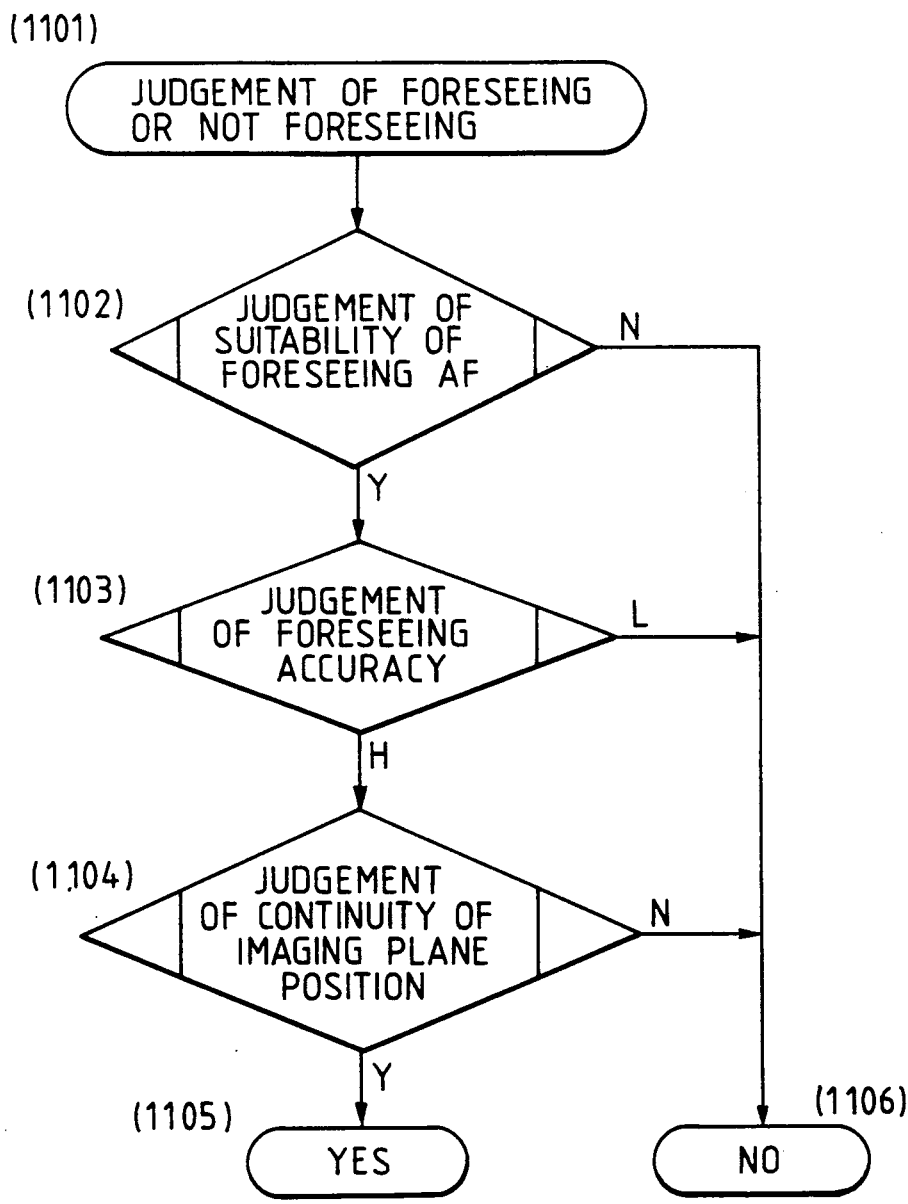
FIG. 18 is the flow chart of another "judgment of foreseeing accuracy" sub-routine.

FIG. 18 is a flow showing another example of the "judgment of foreseeing or not foreseeing" sub-routine of FIG. 1. In this flow, there is shown an example in which the foreseeing accuracy is evaluated from the reliability of the result of three distance measurements and the result of lens driving, whereby the possibility or impossibility of foreseeing is judged.

The step (1132) in FIG. 18 is the "judgment of suitability of foreseeing AF" sub-routine. This sub-routine is the same as that of FIG. 15, and need not be described in detail. If at this step, it is judged that the object is in a condition in which foreseeing AF is effective, a shift is made to step (1103), and if not so, it is judged that the object is unsuitable for foreseeing, and advance is made to step (1106) and an a return is made to the main program.

Step (1103) is the "judgment of foreseeing accuracy" sub-routine, and the details thereof will be described later. At this step, the accuracy of data $DF_1-DF_3$, $DL_1$ and $DL_2$ used in foreseeing calculation is evaluated, and the reliability of the foreseen value is evaluated from the accuracy of these data as a whole. If at the step (1103), it is judged that the reliability of the foreseen value is high, a shift is made to step (1104), and if not so, it is judged that the object is unsuitable for foreseeing, and advance is made to step (1106) and a return is made.

The step (1104) is the "judgment of continuity of imaging plane position" sub-routine. This sub-routine may be that of one of FIGS. 9-13 and therefore need not be described in detail. At this step, whether the photographer is pursuing the same object is judged from the continuity of the imaging plane position, and if it is judged that there is continuity, it is judged that the object is in a state suitable for foreseeing calculation, and an advance is made to step (1105), and if not so, it is judged that the object is unsuitable for foreseeing, and a shift is made to step (1106) and return is made to the main program.

Here, the reason why the "judgment of foreseeing accuracy" is placed before the "judgment of continuity of imaging plane position" is that if the reliability of the respective data is not high, the reliability of the imaging plane position found by the use of these data is low and not worthy of evaluation.

However, such an order of judgment is possible in any other order than that of the present embodiment, and in some cases, the items of judgment may be curtailed.

Figure 19:
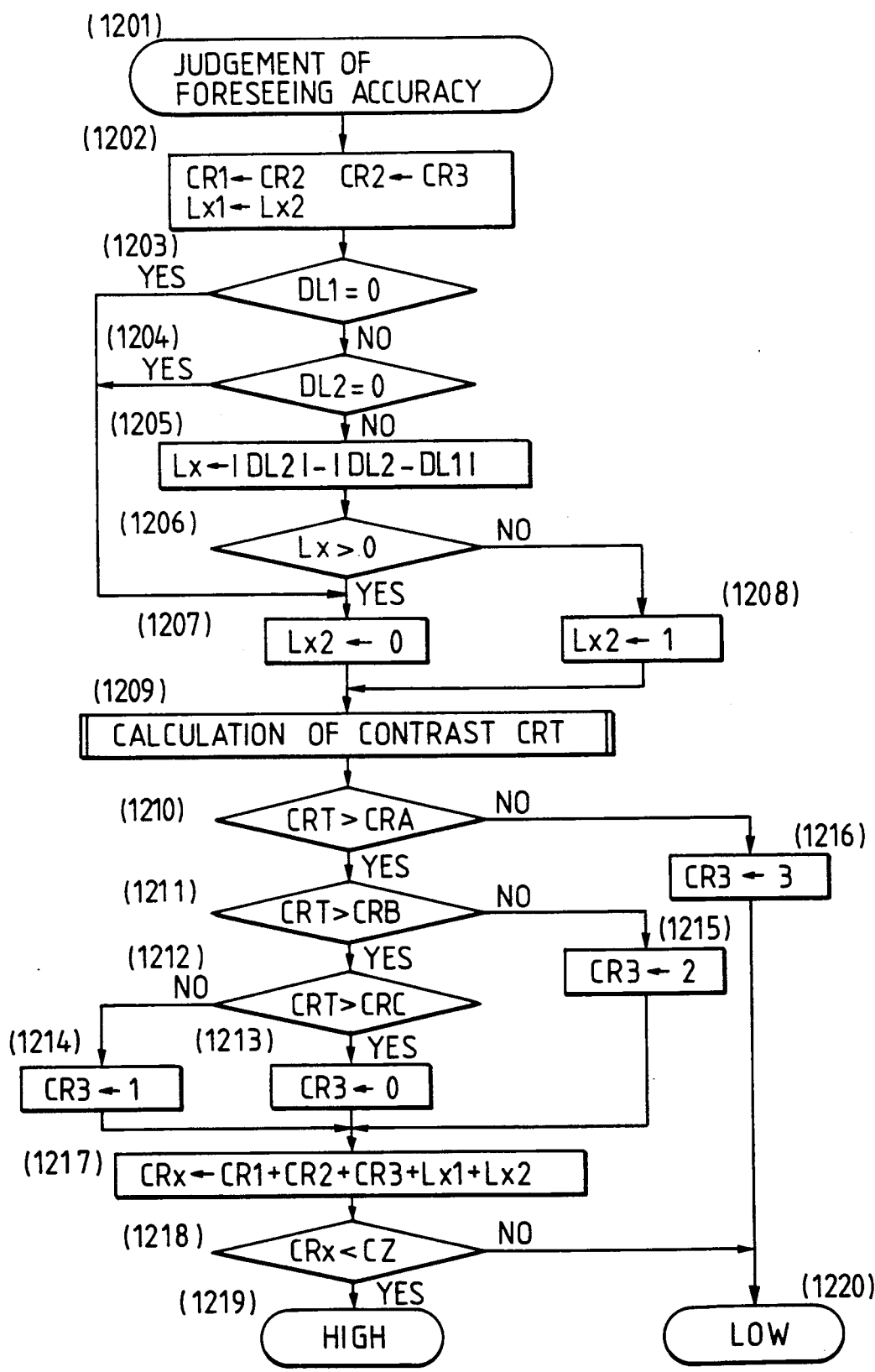
FIG. 19 is the flow chart of the "judgment of foreseeing accuracy" sub-routine in the flow of FIG. 18.

FIG. 19 shows the flow of the "judgment of foreseeing accuracy" sub-routine at the step (1103) of FIG. 18, and the "judgment of foreseeing accuracy" sub-routine will further be described.

Step (1202) affects the renewal of the data of parameters $CR_1$, $CR_2$ and $LX_1$ representative of the before-last and last distance measurement accuracies and the accuracy of the before-last lens driving. This is because there remain the data used in the last judgment and therefore, to effect the judgment of the current foreseeing accuracy, the old data must be renewed into new data. More particularly, at this step, the following three operations are executed:

Inputting the value of $CR_2$ to the parameter $CR_1$ representative of the before-last distance measurement accuracy;

Inputting the value of $CR_3$ to the parameter $CR_2$ representative of the last distance measurement accuracy; and Inputting the value of $LX_2$ to the parameter $LX_1$ representative of the accuracy of the last lens driving.

Figure 2:
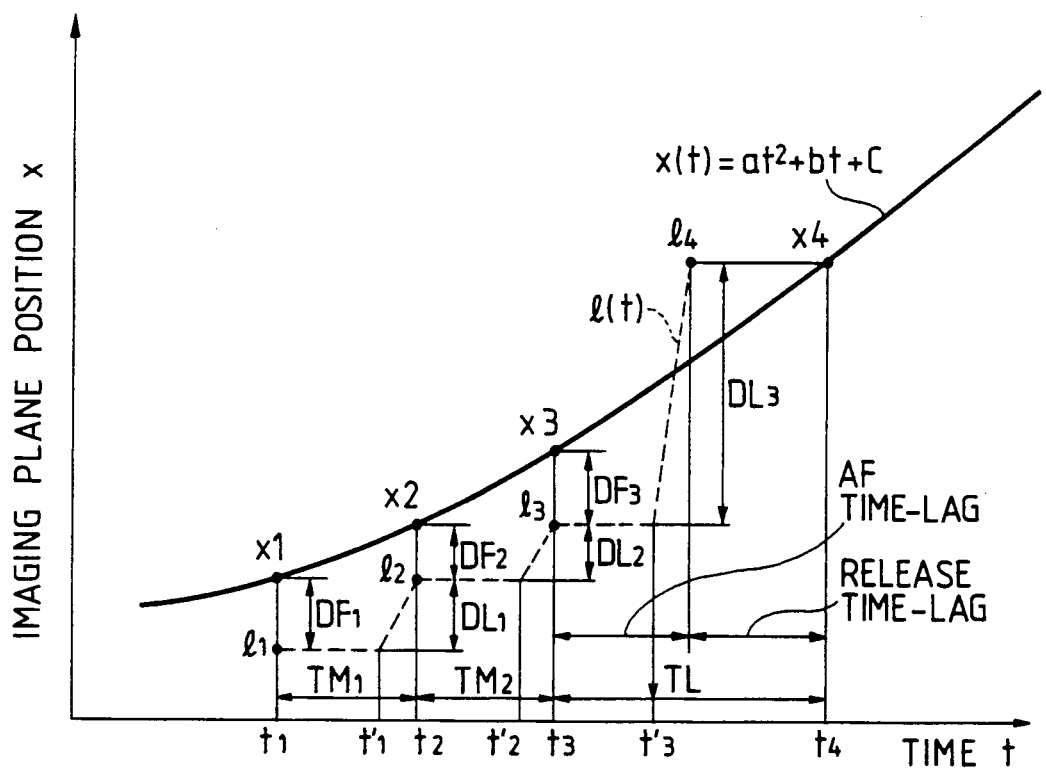
FIG. 2 illustrates the principle of foreseeing of pursuit collection.
Figure 3:
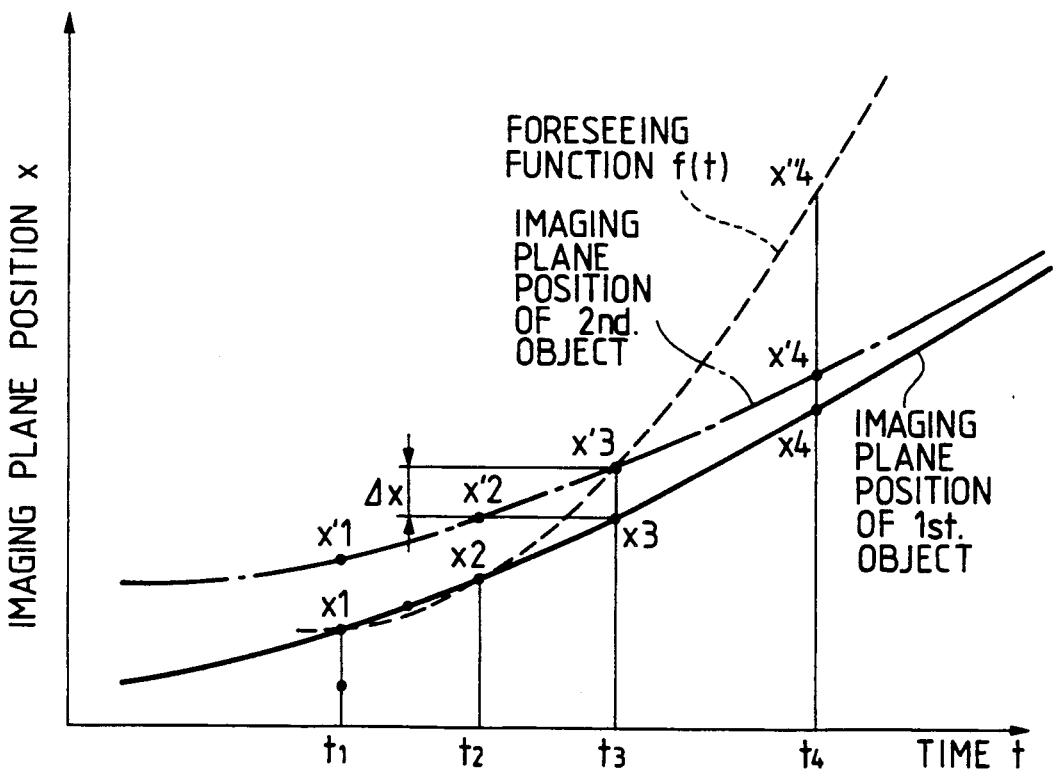
FIG. 3 illustrates the malfunctioning by said pursuit correction.

Here, $CR_1$, $CR_2$ and $CR_3$ are parameters representative of the focus detection accuracies of $DF_1$, $DF_2$ and $DF_3$, respectively, of FIG. 2, and $LX_1$ and $LX_2$ are parameters representative of the lens driving accuracies of $DL_1$ and $DL_2$, respectively.

At the next steps (1203) and (1204), it is judged when $DL_1$ or $DL_2$ is 0 that the direction of lens driving is not reversed, because if $DL_1$ or $DL_2$ is 0, a misjudgment is made when the reversal or non-reversal of the direction of lens driving is to be judged later, and a shift is made to step (1207), and if not so, a shift is made to step (1205).

Figure 15:
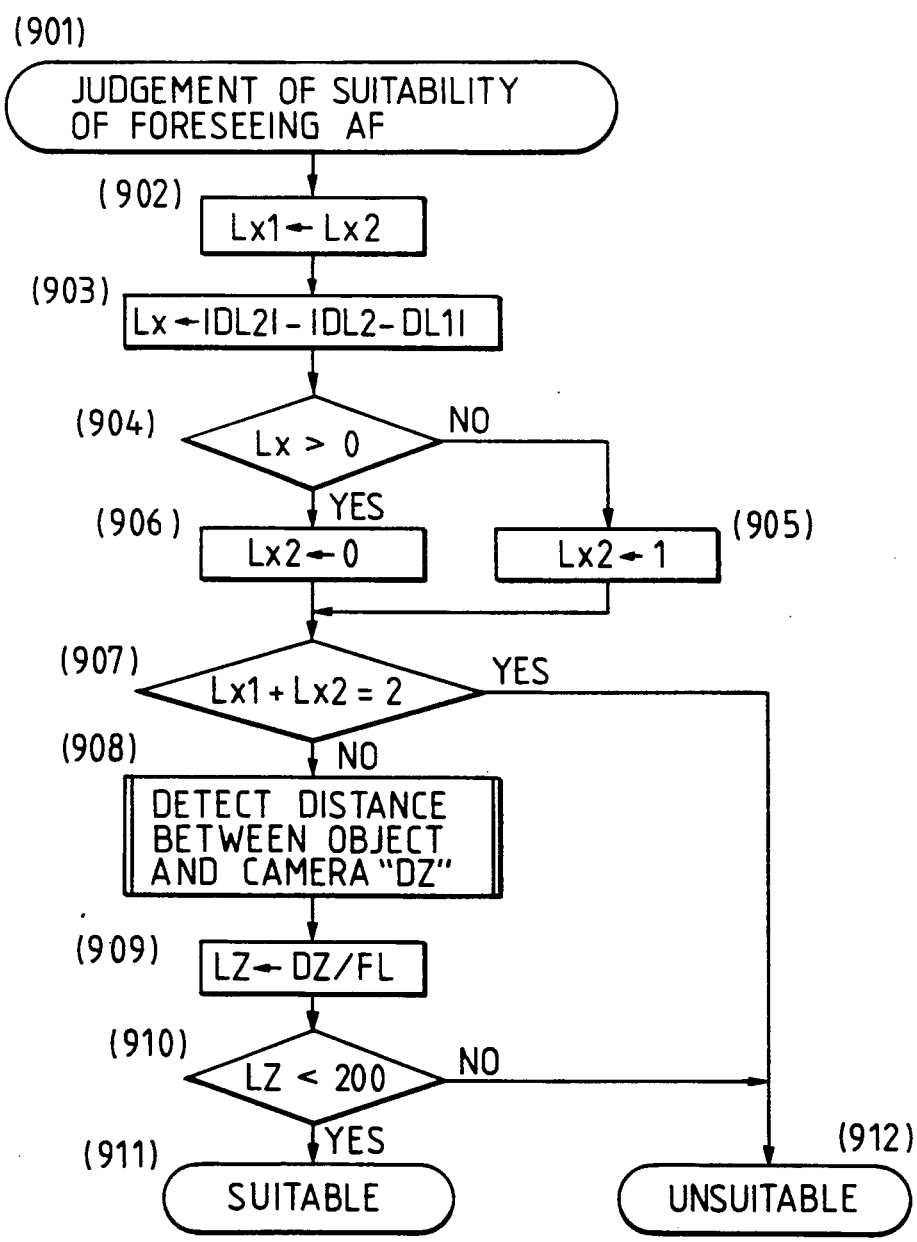
FIG. 15 is the flow chart of the "judgment of suitability of foreseeing AF" sub-routine in the flow of FIG. 8.

At steps (1205) and (1206), the direction of lens driving is judged in the same manner as the judgment of the reversal or non-reversal of the direction of lens driving in FIG. 15, and if the direction of lens driving is reversed, an advance is made to step (1208), where "1" is input to the parameter $LX_2$ representative of the accuracy of lens driving, and if the direction of lens driving is not reversed, an advance is made to step (1207), where "0" is input to $LX_2$.

Here, when the direction of lens driving is reversed, the accuracy of lens driving is reduced by the back-lash of the lens driving system. So, in the present embodiment, when the direction of lens driving has been reversed, it is judged that the accuracy of lens driving is low, and "1" is input to the parameter $LX_2$, and when the direction of lens driving has not been reversed, it is judged that the accuracy of lens driving is high, and "0" is input to $LX_2$. That is, when the values of $LX_2$ and $LX_1$ are "1", it shows that the accuracy is bad, and when said values are " ", it shows that the accuracy is good.

The next step (1209) is a sub-routine for calculating the contrast CRT of the image signal obtained in the "image signal input" sub-routine of the current focus detecting operation detected before this judgment of foreseeing accuracy is rendered, and said contrast CRT is found by this sub-routine. At the next step (1210), the contrast CRT calculated at the step (1209) is compared with a predetermined value CRA, and if CRT>CRA, an advance is made to step (1211), and if not so, a shift is made to step (1216). Here, CRA indicates the limit value of the low contrast of the focus detecting system. If CRT>CRA, it is judged that focus detector is impossible, and at the step (1216), "3" is input to the parameter $C_3$ indicative of the current focus detection accuracy, and a return is made at step (1220). In contrast, if focus detection is possible, an advance is made to step (1211).

At the step (1211), the contrast CRT is compared with a certain number CRB (CRB>CRA), and if CRT>CRB, an advance is made to step (1212), and if not so, a shift is made to step (1215), where "2" is input to the detection accuracy evaluation parameter $CR_3$, and an advance is made to step (1217). If at the step (1211), it is judged that the focus detection accuracy is above a certain level (CRT>CRB), a shift is made to step (1212).

At the step (1212), the contrast CRT is compared with a certain number CRC (CRC>CRB), and if CRT>CRC, it is judged that the focus detection accuracy is very high, and an advance is made to step (1213), where "0" is input to $CR_3$, and if not so, an advance is made to step (1214), where "1" is input to $CR_3$, and a shift is made to step (1217).

It is shown here that the smaller the value of $CR_3$, the higher the detection accuracy. At the step (1217), the sum CRX of the parameters indicative of the focus detection accuracies and the accuracy of lens driving is calculated.

At the next step (1218), CRX is compared with a certain number CZ, and if CRX<CZ, it is judged as data reliable as to total accuracy, and an advance is made to step (1219) and a return is made to the main program. In contrast, if not so, it is judged that there is no reliability of the foreseen value, and a shift is made to step (1220) and a return is made to the main program.

That is, focus detection signals based on the before-last, last and current contrasts are input to the parameters $CR_1$, $CR_2$ and $CR_3$, respectively, and lens driving accuracy signals are input to $LX_1$ and $LX_2$, respectively, and each signal indicates a lower signal as the reliability of the accuracy signals is higher and therefore, when CRX<CZ, it is judged that the reliability is high.

In the present embodiment, the total of the accuracies of the respective data is evaluated as the foreseeing accuracy, but as another method, an evaluation may be made from the time interval or the actual foreseeing calculation equation.

For example, when TL is great relative to $TM_1$ and $TM_2$, it is effective to make the value of CZ small, and in the converse case, it is effective to make the value of CZ great, and in the detection of $x_1$, $x_2$ and $x_3$ of FIG. 2, $x_1 = DF_1$ $x_2 = DL_1 + DF_2$ and $x_3 = DL_1 + DL_2 + DF_3$. So, CRX may also be $CRX = (CR_1^2 + CR_2^2 + LX_1^2 + CR_3^2 + LX_1^2 + LX_2^2)$.

Also, in the present embodiment, an evaluation may be made of factors such as accumulation time, ghost temperature and humidity which affect the focus detection accuracy being added.

Further, as regards the accuracy of lens driving, more effective evaluation of the accuracy will become possible if the evaluation of the driving system of the lens, the lens construction and the lens ID are added.

What is claimed is:

1. A focus adjusting device comprising:
   (a) a focus detecting circuit for repetitively detecting the focus state and outputting a focus detection result conforming to the focus state;
   (b) a memory circuit for memorizing a focus detection result which has been output by said focus detecting circuit for at least one previous focus detection operation;
   (c) a photographing lens;
   (d) a calculation circuit for foreseeing data for making said lens in focus to an object after a predetermined period of time in the future on the bias of the previous focus detection result and a latest focus detection result;
   (e) a lens driving circuit for driving the lens in conformity with the data obtained by said calculation circuit;
   (f) a judgment circuit for judging whether the focus detection result of said focus detecting circuit is suitable for the foreseeing calculation whenever the focus detection circuit outputs the focus detection results; and
   (g) an inhibition circuit for inhibiting lens driving by said lens driving circuit when said judgment circuit judges that the focus detection result is not suitable for the foreseeing calculation for another predetermined period of time.

2. A focus adjusting device according to claim 1, wherein said inhibition circuit inhibits the lens driving when said judgment circuit continuously judges a plurality of times that the focus detection results are not suitable for the foreseeing calculation.

3. A focus adjusting device according to claim 1, wherein said judgment circuit judges whether the latest focus detection result and an immediately previous focus detection result stored in said memory circuit are for the same object.

4. A focus adjusting device according to claim 1, wherein said judgment circuit judges on the basis of an accuracy of said focus detection result whether said data are suitable for use in said foreseeing calculation.

5. A focus adjusting device having a focus detection circuit for repetitively detecting a focus state, a calculation circuit for calculating foreseeing-calculating data for making a lens in focus to an object after a predetermined time on the basis of past data obtained in a past focus detecting operation of said focus detection circuit or focus adjusting operation and data obtained in a latest focus detecting operation of said focus detection circuit or the latest data processed on the basis of said data obtained in a latest focus detecting operation, comprising:
   (a) a judgment circuit for judging whether the data used for said foreseeing calculation are suitable for effecting lens driving using said foreseeing-calculating data, each time said data is renewed; and
   (b) an inhibition circuit for inhibiting the lens driving conforming to the data obtained by said foreseeing calculation when it is judged by said judgment circuit a plurality of times that said data are unsuitable for effecting the lens driving using said foreseeing-calculating data.

6. A focus adjusting device according to claim 5, wherein said judgment circuit judges whether focus detection is being continuously effected for the same object on the basis of the past data and the latest data.

7. A focus adjusting device according to claim 5, wherein said judgment circuit judges whether focus detection is being continuously effected for the same object on the basis of the latest data.

8. A focus adjusting device according to claim 5, wherein said judgment circuit judges on the basis of an accuracy of said focus detection circuit whether said data are suitable for use in said foreseeing-calculation.

9. A focus adjusting device having a focus detection circuit for repetitively detecting a focus state, a calculation circuit for calculating foreseeing-calculating data for making a lens in focus to an object after a predetermined time on the basis of past data obtained in a past focus detecting operation of said focus detection circuit or focus adjusting operation and data obtained in a latest focus detecting operation of said focus detection circuit or the latest data processed on the basis of said data obtained in a latest focus detecting operation, comprising:
   (a) a judgment circuit for judging whether lens driving conforming to the data obtained by said foreseeing calculation should be effected each time when the focus detecting operation is performed; and
   (b) an inhibition circuit for inhibiting the lens driving conforming to the data obtained by said foreseeing calculation when the inhibition of the lens driving conforming to the data obtained by said foreseeing-calculation is judged by said judgment circuit a plurality of times.

10. A focus adjusting device for deriving foreseeing-calculating data for making a lens in focus to an object after a predetermined time in the future on the basis of past data obtained by a past focus detecting operation or focus adjusting operation and data obtained by a latest focus detecting operation or the latest data processed on the basis of said data, and effecting lens driving on the basis of the foreseeing-calculated data, or a camera having said focus adjusting device, comprising:
    (a) a judgment circuit for judging whether lens driving conforming to the data obtained by said foreseeing calculation should be effected each time the focus detecting operation is performed; and
    (b) a data processing circuit for inhibiting, when the inhibition of the lens driving conforming to the data obtained by said foreseeing calculation is judged by said judgment circuit, data obtained by the then focus detecting operation or data processed on the basis of said data from being used as the latest data in said foreseeing calculation.

11. A focus adjusting device or a camera according to claim 10, wherein said data processing circuit causes, when the judgment of said inhibition is performed by said judgment circuit, data obtained by the next focus detecting operation or data processed on the basis of said data to be used as the latest data in said foreseeing calculation.

12. A focus adjusting device or a camera according to claim 11, wherein said judgment circuit judges whether focus detection is being continuously effected for the same object on the basis of the latest data.

13. A focus adjusting device or a camera according to claim 11, wherein said judgment circuit judges whether the accuracy of the data used for said foreseeing calculation is high.

14. A focus adjusting device or a camera according to claim 11, wherein said judgment circuit judges whether focus detection is being continuously effected for the same object on the basis of the past data and the latest data.

15. A focus adjusting device having a focus detection circuit for repetitively detecting a focus state, a calculation circuit for calculating foreseeing-calculating data for making a lens in focus to an object after a predetermined time on the basis of past data obtained in a past focus detecting operation of said focus detection circuit or focus adjusting operation and data obtained in a latest focus detecting operation of said focus detection circuit or the latest data processed on the basis of said data obtained in a latest focus detecting operation, comprising:
 (a) a judgment circuit for judging whether data obtained each time focus detection is effected or data processed on the basis of said data are suitable for said foreseeing calculation; and
 (b) a data processing circuit for inhibiting the foreseeing calculation using said data when it is judged by said judgment circuit that said data are unsuitable for said foreseeing calculation.

16. A focus adjusting device according to claim 15, wherein said judgment circuit judges whether focus detection is being continuously effected for the same object on the basis of the latest data.

17. A focus adjusting device according to claim 15, wherein said judgment circuit judges whether focus detection is being continuously effected for the same object on the basis of the past data and the latest data.

18. A focus adjusting device, comprising:
 (a) a photographing lens;
 (b) a focus detection circuit for repetitively detecting a focus condition of said lens;
 (c) a calculation circuit for calculating a lens driving amount for making an object in focus after a predetermined time in the future by performing a predetermined calculating operation on the basis of a focus detection result detected by said focus detection circuit in the past and a focus detection result obtained in a latest focus detection operation just performed;
 (d) a lens driving circuit for driving said photographing lens by an amount in conformity with the lens driving amount obtained by said calculation circuit;
 (e) a judging circuit for judging whether the focus detection result obtained in every operation of said focus detecting circuit is suitable for the foreseeing calculation;
 (f) an inhibition circuit for inhibiting, when said judging circuit judges that a focus detection result is not suitable for the foreseeing calculation, said latest focus detection result from being transmitted to said calculation circuit as the latest focus detection result just obtained; and
 (g) a reset circuit for resetting a calculating operation of said calculation circuit when, after said judging circuit judges that a focus detection result is not suitable for the focus detection result, said judging circuit continuously judges that each focus detection result is not suitable for the foreseeing calculation by the judging operation of said judging circuit.

19. A focus adjusting device according to claim 18, wherein said judging circuit judges a continuity of changing of an in-focus position on the basis of focus detection result obtained in the past and a focus detection result obtained in the latest operation.

* * * * *

UNITED STATES PATENT AND TRADEMARK OFFICE
CERTIFICATE OF CORRECTION

PATENT NO. : 5,061,951　　　　　　　　Page 1 of 3

DATED : October 29, 1991

INVENTOR(S) : Nobuhiro TAKEDA

It is certified that error appears in the above-identified patent and that said Letters Patent is hereby corrected as shown below:

On the Title page, Item [57], Abstract:
　　　Line 3, "focus" should read --the focus--; and
　　　Line 4, "the" should read --a--.

SHEET 9:
　　　Fig. 13, step (802), "CALCALUTION" should read --CALCULATION--

COLUMN 2:
　　　Line 14, "broken" should read --the broken--; and
　　　Line 34, "to the last," should be deleted.

COLUMN 6:
　　　Line 39, "and" should read --and down and--; and
　　　Line 40, "down and" should be deleted.

COLUMN 7:
　　　Line 55, "steps" should read --step--.

COLUMN 8:
　　　Line 51, "continuely" should read --continually--.

COLUMN 9:
　　　Line 21, "(7) and" should read --(7), (8) and--; and
　　　Line 46, "time" should read --timer--.

COLUMN 11:
　　　Line 31, "nd" should read --and--;
　　　Line 50, "$DF_2$a nd" should read --$DF_2$ and--;
　　　Line 54, "$DL_2$" should read --$DF_2$--; and
　　　Line 56, "$DL_1$" should read --$DF_1$--.

UNITED STATES PATENT AND TRADEMARK OFFICE
CERTIFICATE OF CORRECTION

PATENT NO. : 5,061,951

DATED : October 29, 1991

INVENTOR(S) : Nobuhiro TAKEDA

It is certified that error appears in the above-identified patent and that said Letters Patent is hereby corrected as shown below:

COLUMN 12:
    Line 4, "has" should read --have--; and
    Line 37, "step 306," should read --step (306),--

COLUMN 13:
    Line 39, "(0.035" should read --0.035--; and
    Line 57, "returned" should read --returned to the main program--.

COLUMN 15:
    Line 21, "no&" should read --not--.

COLUMN 16:
    Line 51, "from not" should read --not from--; and
    Line 52, "the" should read --from the--.

COLUMN 17:
    Line 25, "made" should read --main--.

COLUMN 18:
    Line 39, "return" should read --a return--; and
    Line 43, "made." should read --made to the main program--.

COLUMN 19:
    Line 34, "of" should read --by--.

COLUMN 20:
    Line 44 "(1132)" should read --(1102)--;
    Line 50, "advance" should read --an advance--;
    Line 51, "an" should be deleted;
    Line 62, "advance" should read --an advance--; and
    Line 63, "made." should read --made to the main program--.

UNITED STATES PATENT AND TRADEMARK OFFICE
CERTIFICATE OF CORRECTION

PATENT NO. : 5,061,951                    Page 3 of 3

DATED     : October 29, 1991

INVENTOR(S) : Nobuhiro TAKEDA

It is certified that error appears in the above-identified patent and that said Letters Patent is hereby corrected as shown below:

COLUMN 21:
    Line 6, "return" should read --a return--.

COLUMN 22:
    Line 2, " " "," should read --"0",--; and
    Line 18, "return" should read --return to the main program--.

COLUMN 23:
    Line 29, "bias" should read --basis--.

COLUMN 24:
    Line 24, "foreseeing-calculation." should read
        --foreseeing calculation.--;
    Line 44, "foreseeing-" should read --foreseeing--.

Signed and Sealed this

Twentieth Day of July, 1993

Attest:

MICHAEL K. KIRK

*Attesting Officer*      *Acting Commissioner of Patents and Trademarks*